(12) United States Patent
Massoptier-David et al.

(10) Patent No.: US 12,703,164 B2
(45) Date of Patent: Aug. 11, 2026

(54) TILTING ROLLER SYSTEM FOR FOLDING A PNEUMATIC TIRE CARCASS INSERT AROUND A BEAD CORE AND FOLDING-UP METHOD

(71) Applicant: Compagnie Generale Des Etablissements Michelin, Clermont-Ferrand (FR)

(72) Inventors: Michael Massoptier-David, Clermont-Ferrand (FR); Bertrand Guery, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 165 days.

(21) Appl. No.: 18/574,235

(22) PCT Filed: Jun. 22, 2022

(86) PCT No.: PCT/FR2022/051219
§ 371 (c)(1),
(2) Date: Dec. 26, 2023

(87) PCT Pub. No.: WO2023/275457
PCT Pub. Date: Jan. 5, 2023

(65) Prior Publication Data

US 2024/0140060 A1 May 2, 2024

(30) Foreign Application Priority Data

Jun. 30, 2021 (FR) ...................................... 2107014

(51) Int. Cl.
*B29D 30/32* (2006.01)

(52) U.S. Cl.
CPC ...... *B29D 30/32* (2013.01); *B29D 2030/3257* (2013.01)

(58) Field of Classification Search
CPC ............................................ B29D 2030/3257
(Continued)

(56) References Cited

U.S. PATENT DOCUMENTS 2,373,354 A 4/1945 Sternad et al.
2,828,797 A * 4/1958 Vanzo .................. B29D 30/28 156/402

(Continued)

FOREIGN PATENT DOCUMENTS

FR 2352662 A1 12/1977
FR 2354875 A1 1/1978
JP 2008074058 A 4/2008

OTHER PUBLICATIONS

Gazuit. FR2354875. 1978. Machine Translation via ESpaceNet. Accessed Aug. 11, 2025. (Year: 2025).*

*Primary Examiner* — Sedef E Paquette
*Assistant Examiner* — Alexander D Booth
(74) *Attorney, Agent, or Firm* — Dickinson Wright PLLC

(57) ABSTRACT

The folding-up system is intended to fold an end portion of a cylindrical wall of a tire carcass assembly around a reinforcing bead core. The system comprises a drive device that is arranged to cause the carcass assembly to revolve intermittently about its roll axis, by successive angular increments, together with a folding device to cause pressure rollers to tilt. After each angular increment in roll, about a pitch axis perpendicular to the roll axis, in order to fold each portion of the end section located in an angular working sector occupied by a pressure roller towards the radially inner face of the wall, around the reinforcing bead core. Finally, the drive device includes a selector for placing the pressure rollers in a withdrawn position to disengage the trajectory followed by the wall of the carcass assembly during its roll rotation.

11 Claims, 9 Drawing Sheets

(58) Field of Classification Search
USPC .................................................. 156/402, 400
See application file for complete search history.

(56) References Cited

U.S. PATENT DOCUMENTS

| | | | | |
|---|---|---|---|---|
| 4,614,562 | A | 9/1986 | Jones | |
| 2006/0102272 | A1* | 5/2006 | Iyanagi | B29D 30/36 156/402 |
| 2017/0326826 | A1* | 11/2017 | Hinc | B29D 30/248 |

* cited by examiner

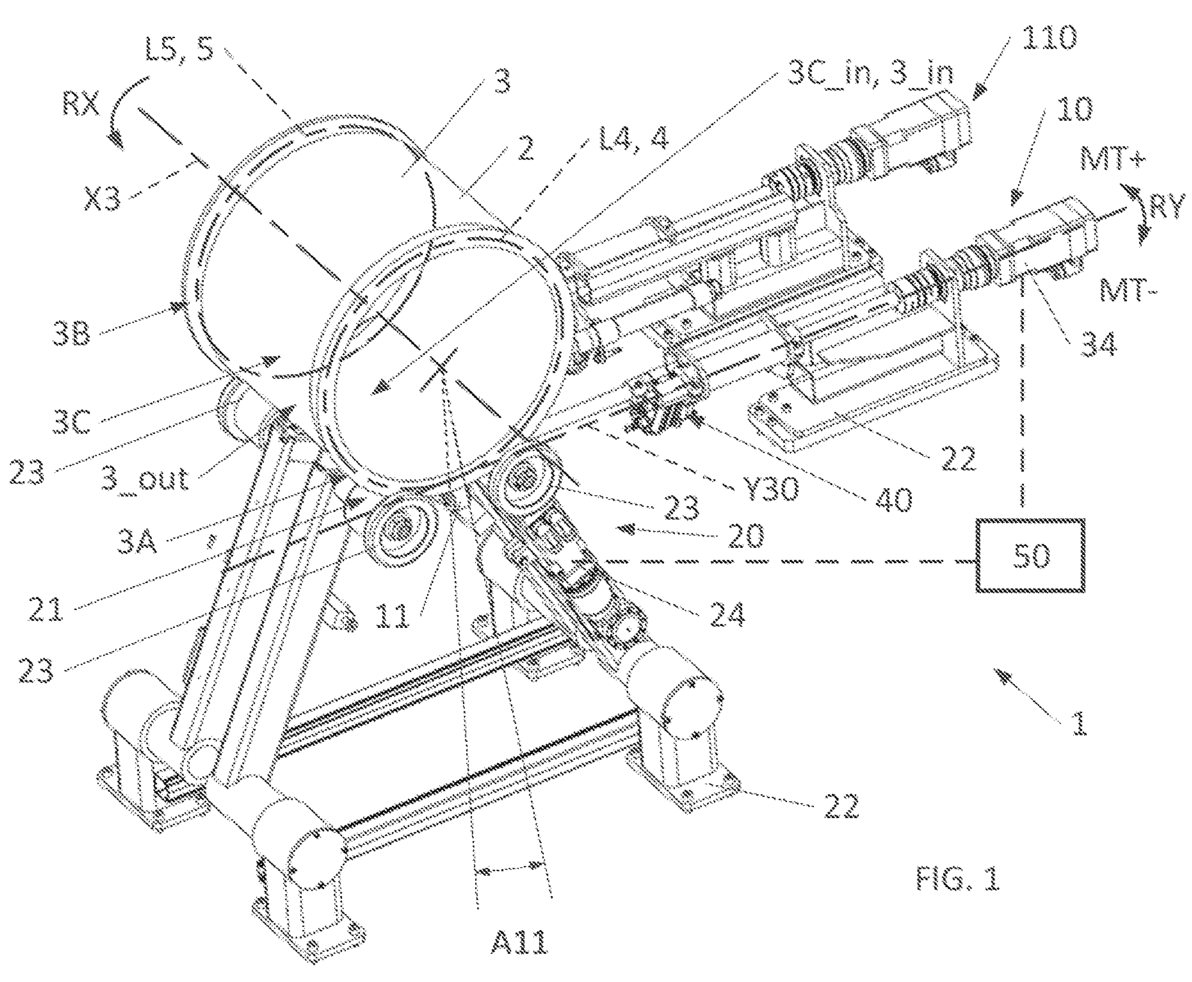
FIG. 1
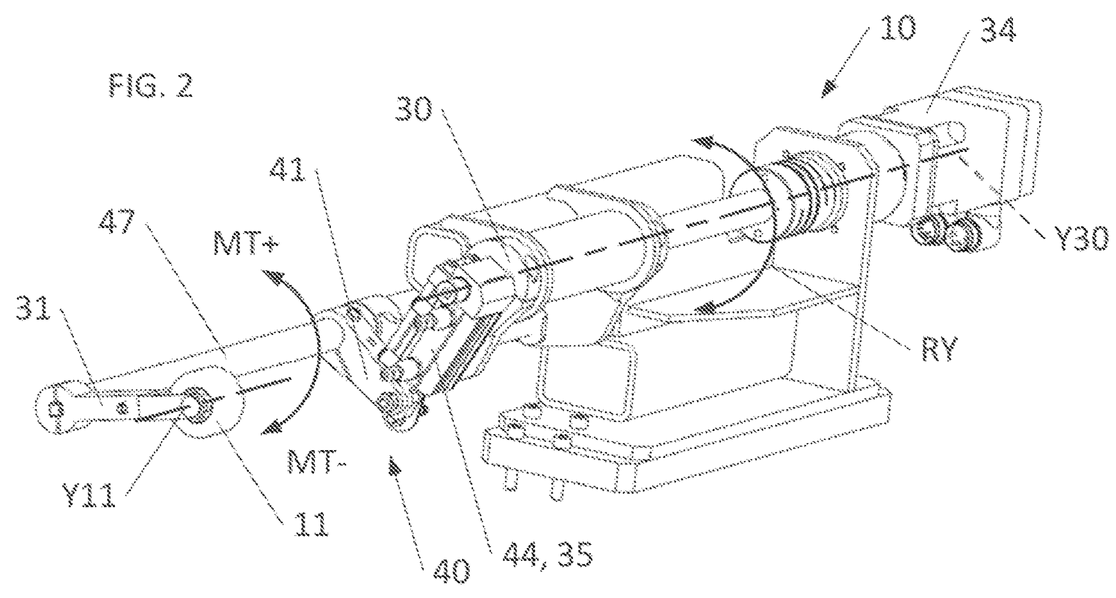

10
MT+
34
Y30
RY
MT-
30
45, 35
40
42
46, 35
13
Y13
43
12
Y12
41
44, 35
11
Y11

47
33
49
32
48
31

L4, 4
2
3C_in, 3_in
1
MT+
RY
3
MT-
RX
34
X3
10

13
3C
33
3A
3_out
32
12
Y30
31
11

W11
Y30
Y11
RX
11
Y12
W12
A11
A12
X3
12
A13
13
Y13
W13
48
47
L4, 4
3C
3A
3_in
2
3
3_out
49
44
46
10
30
45
20
1

34

2
X3
3A, 3B
3C_in, 3_in
E3, E3C
3C
4, 5
E3A, E3B
3A_in,
3B_in

3out
L4, L5
11, 12, 13
3A_out,
3B_out
X3
3A_in,
3B_in
3C_in, 3_in
3A, 3B
2
3C

MT+
4, 5
3
3A_out,
3B_out
MT
L4, L5, Y30
MT-
11, 12, 13
X3
3A, 3B
3C_in, 3_in
3A_out,
3B_out
2
3C 3
11, 12, 13
3A_in,
3B_in
4, 5
MT
L4, L5
X3
3A, 3B
2
3A_out,
3B_out
11, 12, 13
3C_in, 3_in
MT+

3C
L4, L5
3
4, 5
3A_in,
3B_in
MT

X3
2

4, 5
3A, 3B
3_in
L4, L5, Y30
11
3
33
10
3C
31
32
2
4, 5
3A, 3B

L4, L5
Y11
3
3C
11
31
11
2
MT+
MT_11
3A, 3B
MT
4, 5
10
3
3C
L4, L5

MT- 2
3A, 3B
Y13
13
4, 5
12
L4, L5
3
33
3C 11
31
49
47
48
30
32
49
33
11
2
12
3A, 3B
MT+
32
13
31
3
MT
3C
4, 5
L4, L5, Y30

MT-
3A, 3B
MT_12
49
12
48
30
MT_13
2
11
3
13
MT_11
3C
4, 5
10
L4, L5

46

2
3A
1
3
3C
34
10
3_in
X3
13
L4, 4
3_out
Y30
11
12

1
2
3A
MT+
3
3C
34
RY
MT-
X3
10
3_out
13
30
30
49
12
48
47
46
L4, 4

3_in
11
Y30

TILTING ROLLER SYSTEM FOR FOLDING A PNEUMATIC TIRE CARCASS INSERT AROUND A BEAD CORE AND FOLDING-UP METHOD

CROSS-REFERENCE TO RELATED APPLICATION

This application claims priority to and the benefit of PCT Patent Application No. PCT/FR2022/051219, filed on 22 Jun. 2022, entitled “TILTING ROLLER SYSTEM FOR FOLDING A PNEUMATIC TIRE CARCASS INSERT AROUND A BEAD CORE AND FOLDING-UP METHOD” and to French FR 2107014, filed on Jun. 30, 2021, and entitled “TILTING ROLLER SYSTEM FOR FOLDING A PNEUMATIC TIRE CARCASS INSERT AROUND A BEAD CORE AND FOLDING-UP METHOD.”

BACKGROUND

1. Field

The present disclosure relates to the general field of tire manufacture, more particularly the manufacture of pneumatic tires, and notably the manufacture of pneumatic tires intended for aircraft or pneumatic tires intended for civil engineering vehicles.

The present disclosure relates more particularly to the manufacture of tire carcass assemblies intended to form the reinforcements of such tires. More specifically, the present disclosure concerns the operation of folding up, in which, after the formation of a sub-assembly comprising, on the one hand, a first annular reinforcing bead core and a second annular reinforcing bead core, intended to reinforce the beads of the tire which fasten the tire to a rim, and on the other hand a carcass ply containing reinforcing wires connecting the first and second reinforcing bead cores to one another, each of the free axial ends of the carcass ply is folded into the carcass ply, around the reinforcing bead core closest to it, so as to trap the reinforcing bead core in the carcass ply fold thus formed.

2. Related Art

For the implementation of this folding-up operation, it has been proposed, notably, to press the end of the carcass ply against the reinforcing bead core by means of a concave roller in the shape of a diabolo, that is to say an hourglass shape formed by joining two opposed truncated cones by their apexes, the concavity of which shape substantially fits the shape of the bead core cross section, while the axis of rotation of the shape is transverse to the circumferential direction of the bead core; to put the carcass ply and the bead core into rotation together so that the roller rolls over the outer face of the carcass ply along a circumferential trajectory following the annular path of the reinforcing bead core; and to cause the roller to penetrate progressively towards the inside of the carcass ply by causing the central axis of the roller to tilt towards the inside of the carcass ply, while the roller rolls continuously along the reinforcing bead core, in such a way that, as the carcass ply continues to rotate about itself, the roller presses and progressively folds the free end of the carcass ply around the reinforcing bead core towards and against the inner face of the carcass ply.

However, because the roller moves by rolling over the carcass ply in a movement following a circumferential direction, that is to say a direction tangential to the reinforcing bead core and substantially normal to the radial plane containing the central axis of the carcass ply and passing through the contact point between the roller and the carcass ply, the roller exerts on the free end of the ply, during the folding-up action, a force component orientated in the circumferential direction, which tends to push the free end of the carcass ply in the circumferential direction and therefore to cause a corresponding deflection of the reinforcing filaments, which may even crease the free end of the carcass ply while the latter is being folded on to the inner face of the carcass ply.

There are also proposals to develop pneumatic tires which have free ends of the carcass plies that have a large axial length projecting from the reinforcing bead cores, so that the free ends are even more susceptible to creasing, and furthermore cannot be fully folded by a known roller applying a circumferential roller pressing action, since such a roller does not have a sufficient axial span to reach the edge of the free end of the carcass ply and press the edge against the inner face of the carcass ply, at a relatively large axial distance from the reinforcing bead core.

SUMMARY

The objects of the disclosure are therefore to overcome the aforementioned drawbacks and to propose a new system, together with a new folding-up method, for the reliable, fast and reproducible execution of a folding-up operation, particularly on a tire that has a carcass ply having very long free ends.

The objects of the disclosure are achieved by means of a folding-up system intended to fold an end section of a cylindrical wall of a tire carcass assembly around a reinforcing bead core of the carcass assembly. The cylindrical wall extends along and around a central axis called the “roll axis”, and the reinforcing bead core extends along a generatrix forming a ring around the roll axis. The system also includes a folding device that has at least one pressing member, such as a pressure roller, and is arranged to cause the pressing member to be applied against the radially outer face of the end section, in an angular sector of the cylindrical wall called the “angular working sector.” The angular working sector corresponds to a fraction of the circumference of the end section around the roll axis. This causes the pressing member to execute a tilting pitching movement about the generatrix of the reinforcing bead core, so that the pressing member folds the portion of the end section located in the angular working sector concerned towards the radially inner face of the cylindrical wall of the carcass assembly, around the reinforcing bead core. The system further includes a drive device that is designed to modify the relative position of the pressing member, by successive angular increments, with respect to the carcass assembly about the roll axis, so that the pressing member can execute its tilting pitching movement in different angular working sectors in order to fold the corresponding portions of the end section, one after another. The system also includes a selector that is designed to place the pressing member, alternately, in a working configuration, enabling the pressing member to bear against the outer face of the end portion in the angular working sector concerned and to force the corresponding portion of the end section to be folded when the folding device executes the tilting pitching movement in the angular working sector concerned. Then in a withdrawn configuration, the selector prevents the pressing member from interfering with the end section when the drive device modifies the relative position of the pressing member with respect to the cylindrical wall of the carcass assembly, about the roll axis, to change the angular working sector.

Advantageously, the disclosure may be used to implement a step-by-step process of folding by successive angular increments about the roll axis, in which, at each new step, that is to say whenever the pressing member is placed in a new angular working sector, a new tilting pitching movement of the pressing member is executed, enabling the end section to be folded and pressed against the radially inner face of the wall of the carcass assembly.

Advantageously, the tilting pitching movement responsible for folding the end section is local, on the one hand, in that the tilting pitching movement is limited to the angular working sector concerned, that is to say the angular sector which is occupied by the pressing member about the roll axis, and which therefore represents a simple fraction of the circumference of the reinforcing bead core. On the other hand, the movement is executed about a tilting axis which in practice substantially coincides with the circumferential direction defined by the generatrix and embodied by the reinforcing bead core in the angular sector concerned, so that the tilting pitching movement does not apply a circumferential force to the portion of the end section subject to the folding operation.

Furthermore, the withdrawal of the pressing member during the relative rolling movement of the pressing member with respect to the wall of the carcass assembly prevents the pressing member from coming into contact with the wall of the carcass assembly, and more particularly with the end section of the wall, and notably prevents the pressing member from rubbing against the end section or, more generally, against the wall of the carcass assembly while the pressing member is being transferred towards a new angular working sector.

Thus at no time does the pressing member according to the disclosure exert on the end section any force orientated along the circumferential direction of the cylindrical wall of the carcass assembly, or more particularly along the directrix of the reinforcing bead core, whether it be during the folding operation executed by a tilting pitching movement while the pressing member is located in a given working sector around the roll axis, or during the transfer operation for moving the pressing member along the circumferential direction of the reinforcing bead core so as to reposition the pressing member in a new angular working section about the roll axis.

Thus the end section is neither deflected in azimuth about the roll axis with respect to the central section of the carcass ply, nor creased, nor stretched by torsion in the circumferential direction.

Finally, the disclosure therefore advantageously enables the end section to be folded against the inner face of the central section of the wall of the carcass assembly in an automatic and progressive manner, piece by piece, angular sector by angular sector, until the accumulation of the angular sectors subjected individually to folding-up reaches or even exceeds the equivalent of a full revolution about the roll axis. Thus, the end section is finally entirely folded on to the inner face of the central cylindrical section of the wall of the carcass assembly, thereby trapping the reinforcing bead core along the whole perimeter of the reinforcing bead core concerned about the roll axis, within an annular ply of the carcass layer, this ply forming the future bead of the tire.

BRIEF DESCRIPTION OF THE DRAWINGS

Further subjects, features and advantages of the disclosure will become apparent in more detail from reading the following description and with the aid of the appended drawings, which are provided purely by way of illustration and without limitation and in which:

FIG. 1 shows, in a perspective view, an example of a system according to the disclosure, comprising two folding devices, one of which is intended to fold up a first end section of the wall of the carcass assembly over and around a first reinforcing bead core, while the other is intended to fold up, preferably simultaneously, a second end section of the same carcass assembly wall, opposed axially to the first end section, over and around a second reinforcing bead core.

FIG. 2 shows, in a perspective detail view, a folding device of the system of FIG. 1, comprising a single pressing member formed by a pressure roller.

DETAILED DESCRIPTION OF THE ENABLING EMBODIMENT

Figure 3:
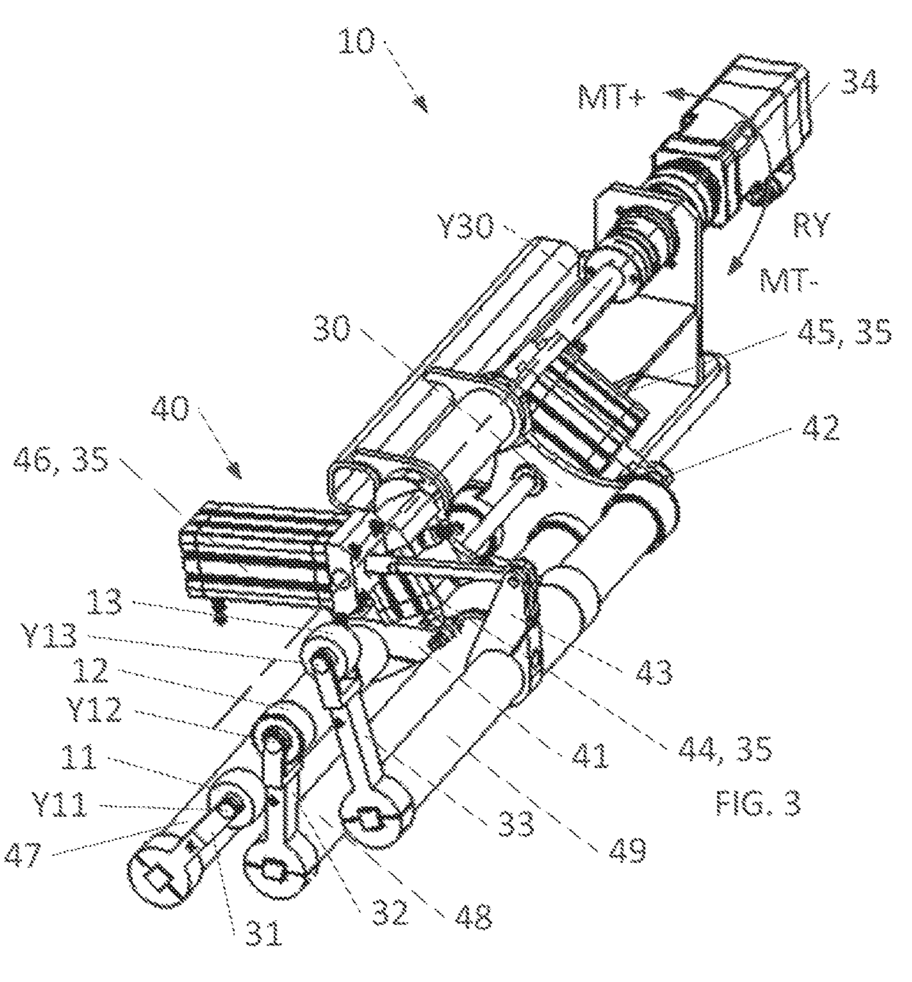
FIG. 3 shows, in a perspective view, a variant folding device comprising three pressing members, each formed by a pressure roller.

The present disclosure relates to a folding-up system 1, which is intended to fold an end section 3A, 3B of a cylindrical wall 3 of a tire carcass assembly 2 around a reinforcing bead core 4, 5 of the carcass assembly 2.

The disclosure therefore relates more generally to the manufacture of tires, notably pneumatic tires, to be fitted to vehicle wheels, and more particularly pneumatic tires to be fitted to the wheels of aircraft landing gear or, preferably, pneumatic tires to be fitted to the wheels of civil engineering vehicles.

The carcass assembly 2 forms part of the tire reinforcement, to be shaped in a toroidal form and to have its radially outer crown covered by a "crown assembly" comprising at least a tread intended to come into contact with the road, together with, preferably, one or more additional reinforcing structures, placed under the tread, such as reinforcing plies and/or one or more reinforcing strips wound in turns to form an encirclement known as a "hoop".

In a known manner, the carcass assembly 2 of the tire comprises a first reinforcing bead core 4 and a second reinforcing bead core 5 of annular shape, substantially inextensible in length, each of which is made to reinforce a tire bead for fastening the tire to a mounting support such as a rim. The tires to which the disclosure relates, notably tires for civil engineering vehicles, may be designed to be mounted on rims having diameters of between 33 and 63 inches.

The reinforcing bead cores 4, 5 may be made from any material having a sufficiently high predetermined tensile modulus, for example from metal wires, notably steel wires, coated in rubber if required, or from tensile-resistant polymer threads, made of aramid for example, or possibly from continuous composite threads or strips formed using glass fibres embedded in resin.

The reinforcing bead cores 4, 5 may be produced, for example, by interweaving a plurality of threads to form a braided torus having the desired diameter corresponding to the diameter of the rim on which the tire will be mounted, or else by winding the threads in juxtaposed and superimposed turns to form a torus of the desired diameter.

The carcass assembly 2 also comprises at least one carcass ply formed by a rubber-based ply in which a plurality of reinforcing wires, extending parallel to one another, are embedded. The carcass ply is wound on itself so as to form a tubular structure of the wall 3 of the carcass ply 2, and extends from the first reinforcing bead core 4 to the second reinforcing bead core 5 so that each of the reinforcing threads of the carcass ply connects the first reinforcing bead core 4 to the second reinforcing bead core 5, which is coaxial with, and axially distant from, the first reinforcing bead core 4.

The carcass assembly 2 preferably also comprises some additional elements such as a sealing layer, usually of butyl, which ensures the air-tightness of the wall 3 and therefore of the inflation chamber of the pneumatic tire delimited by the wall 3, or rubber cushions intended to form a protective padding around the reinforcing bead cores 4, 5 in the tire beads.

For convenience of description, although the carcass assembly 2 usually comprises two reinforcing bead cores 4, 5 with one reinforcing bead core 4, 5 in each bead of the tire, the following text may refer to only one of the reinforcing bead cores, on the understanding that descriptions concerning one of the reinforcing bead cores 4, 5 may be duplicated in and/or transposed to, mutatis mutandis, the other reinforcing bead core.

It should also be noted that, in some types of tire, two reinforcing bead cores 4, 5 may be provided in each bead, making a total of four reinforcing bead cores in the carcass assembly 4, so that annular reinforcers of two different diameters can be placed in each bead. However, the disclosure is applicable regardless of the number of reinforcing bead cores 4, 5 which are located in the same bead, and therefore at the same edge of the tire, and around which the same end section 3A, 3B is folded to enclose the reinforcing bead core or cores 4, 5 concerned in the same fold of the wall 3, and more particularly in the same fold of the carcass ply.

In geometrical terms, and as shown, notably, in FIGS. 1, 4, 18 and 19, the cylindrical wall 3 extends along and around a central axis X3 called the "roll axis" X3, and the reinforcing bead core 4, 5 extends along a generatrix L4, L5 which forms a ring around the roll axis X3.

The roll axis X3 corresponds to the central axis common to the two reinforcing bead cores 4, 5 and to the wall 3 of the tire 2, this wall 3 having a shape of revolution centred on the roll axis X3.

In practice, the roll axis X3 coincides with the future axis of rotation of the tire, and therefore with the future axis of rotation of the wheel fitted with the tire.

The cylindrical wall 3 has a cylindrical central section 3C corresponding to the portion of the wall 3 that extends along the roll axis 3 from the first reinforcing bead core 4 to the second reinforcing bead core 5. The wall 3 also has at least a first cylindrical end section 3A which extends the cylindrical central section 3C by projecting axially beyond the first reinforcing bead core 4. Preferably, the wall 3 also has, at its axially opposed end, a second cylindrical end section 3B which extends the cylindrical central section 3C by projecting axially beyond the second reinforcing bead core 5.

For convenience of description, the following text may refer equally well to the first end section 3A or the second end section 3B, in that what is true of the one, considered individually, is preferably also true of the other.

In practice, the end section 3A, 3B is formed in one piece with at least one structural element of the central section 3C.

More particularly, the end section 3A, 3B preferably contains at least, and if necessary contains only, a portion of the carcass ply formed in one piece with the portion of the carcass ply that is contained in the central section 3C and whose reinforcing threads connect the first reinforcing bead core 4 to the second reinforcing bead core 5. The end section 3A, 3B therefore contains, or is exclusively identified with, an annular end part of the carcass ply of the carcass assembly 2, which projects axially beyond the reinforcing bead core 4, 5 that is axially closer to the edge of the carcass ply, so that the part extends from the reinforcing bead core 4, 5 in question to the edge of the carcass ply which forms the axial end of the carcass ply that is axially closer to the reinforcing bead core 4, 5.

It should be noted that the end sections 3A, 3B of the carcass assemblies 2 that may be processed according to the disclosure, and that are notably intended for pneumatic tires for civil engineering vehicles, and more particularly for pneumatic tires of civil engineering vehicles intended to be mounted on rims having diameters of between 33 and 63 inches, preferably have a large axial length to be folded, typically in the range from 5 to 40 cm, notably for the purpose of making the tire robust to impact, deformation and high loads to which the tire may be subjected in its normal conditions of use.

Conventionally, the "axial" direction will be taken to mean a direction parallel to the direction of the axis concerned, in this case the roll axis X3.

Conventionally, the "radial" direction will be taken to mean a direction perpendicular to the roll axis X3, and therefore, more particularly, a direction followed by a radius of the cylindrical wall 3.

Thus, as may notably be seen in FIGS. 1, 4 and 6 to 9, the "radially inner face" 3_in of the cylindrical wall 3, and more particularly the radially inner face 3C_in of the central section 3C and the radially inner faces 3A_in, 3B_in of the end sections 3A, 3B, denote the faces, concave in this case, of the cylindrical wall 3 that are initially, before the folding-up operation, those radially closest to the roll axis X3, and that are therefore initially orientated towards the inside of the carcass assembly 2.

Similarly, the "radially outer face" 3 out of the cylindrical wall 3, and more particularly the radially outer faces 3A_out, 3B_out of the end sections 3A, 3B, correspond to the faces that are initially those radially farthest from the roll axis X3, and that therefore initially form the convex apparent faces of the carcass assembly 2, orientated towards the outside of the carcass assembly 2.

Purely for guidance, the thickness E3 of the wall 3, considered in the radial direction, will be entirely in the range from 1 to 25 mm, depending on the nature of the tire considered. More particularly, the thickness E3C of the wall 3 in the central section 3C is preferably in the range from 4 to 25 mm, while the thickness of the wall E3A, E3B in the end section 3A, 3B concerned, preferably thinner than the wall of the central section 3C, is preferably in the range from 1 to 10 mm. For guidance, a tire intended for a private car may preferably have a wall thickness E3C in the central section 3C in the range from 4 to 8 mm, and a lesser thickness E3A, E3B in the end section, in the range from 1 to 3 mm. In the case of a civil engineering tire, these thicknesses are preferably in the range from 15 to 25 mm for E3C and 6 to 10 mm for E3A, E3B respectively.

Preferably, the generatrix L4, L5 of each reinforcing bead core 4, 5 is contained within a plane normal to the roll axis X3, so that the generatrix L4, L5 along which the reinforcing bead core 4, 5 concerned extends in length is orientated in the circumferential direction of the carcass assembly 2, and more generally in the circumferential direction of the tire.

The term "circumferential" is taken to mean an orthoradial direction, in other words that of a direction vector which, at the point in question, is, on the one hand, perpendicular to the radius which runs from the central axis in question, in this case the roll axis X3, and which reaches the point in question, and, on the other hand, orthogonal to the central axis in question, in other words contained in a plane normal to the axis, and therefore, in this case, contained in a plane normal to the roll axis X3.

Figure 5:
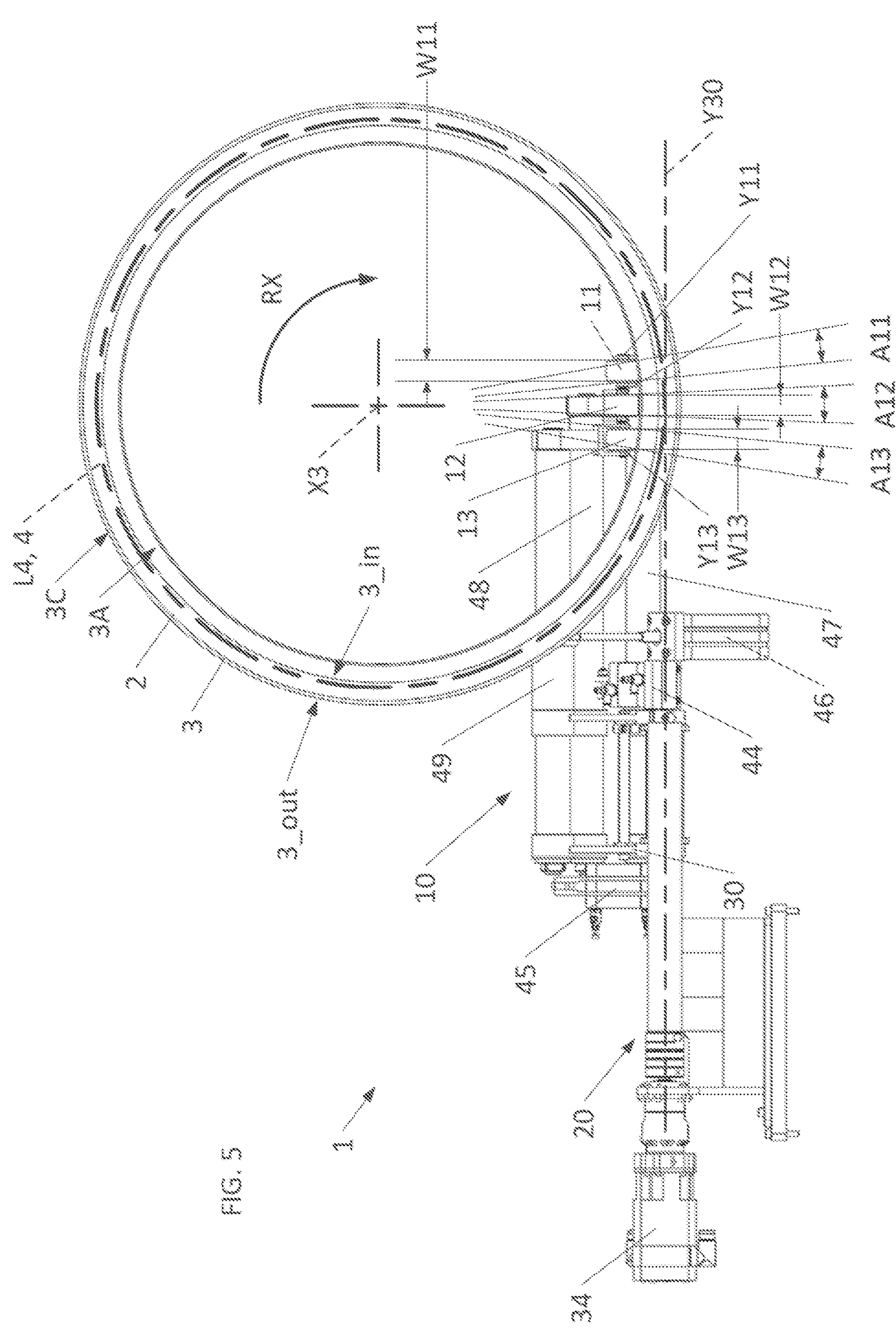
FIG. 5 shows, in a side view, the positioning of the three pressure rollers of the folding device of FIG. 3 about the roll axis, each in its own angular working sector.

According to the disclosure, the system comprises, firstly, a folding device 10 which comprises at least one pressing member 11, 12, 13, such as a pressure roller 11, 12, 13, and which is arranged to cause the pressing member 11, 12, 13 to be applied against the radially outer face 3A_out, 3B_out of the end section 3A, 3B, in an angular sector A11, A12, A13 of the cylindrical wall 3 called the "angular working sector" A11, A12, A13, which corresponds, as is apparent in FIG. 5, to a fraction of the circumference of the end section 3A, 3B around the roll axis X3, and to cause the pressing member 11, 12, 13 to execute a tilting pitching movement MT around the generatrix L4, L5 of the reinforcing bead core 4, 5, so that the pressing member 11, 12, 13 folds towards the radially inner face 3_in of the cylindrical wall 3 of the carcass assembly 2, around the reinforcing bead core 4, 5, the portion of the end section 3A, 3B that is located in the angular working sector A11, A12, A13 concerned.

The pressing member 11, 12, 13 may take any appropriate form. Thus, for example, the pressing member 11, 12, 13 could take the form of a spatula at the curved end, arranged to slide over the outer face 3A_out, 3B_out of the end section 3A, 3B, somewhat in the manner of the sole of a flat-iron, as the tilting pitching movement MT progresses. Evidently, in this case the spatula will be made of, or covered in, a material that prevents the raw rubber of the wall 3 from adhering to the spatula, to ensure that the spatula slides smoothly over the surface of the end section 3A, 3B.

However, in a particularly preferred manner, the pressing member 11, 12, 13 is formed by a roller which is mounted for rotation, preferably for free rotation, about its central axis Y11, Y12, Y13 which is substantially tangential to the circumferential direction in the angular working sector A11, A12, A13, so that the pressure roller 11, 12, 13 can roll over the outer face 3A_out, 3B_out of the end section 3A, 3B, in order that the tilting pitching movement MT can generate the roller pressing of the end section 3A, 3B against the reinforcing bead core 4, 5 and against the inner face 3_in of the wall 3 of the carcass assembly 2. For convenience of description, the pressing member 11, 12, 13 may therefore be considered as equivalent to a pressure roller in the following text, and the same references 11, 12, 13 may be used equally well to denote either of these elements.

In all cases, the aim of the folding is to cause the end section 3A, 3B to be applied and made to adhere, by the natural adhesive effect (or "tack") of the raw rubber, to the inner face 3_in of the wall 3 of the carcass assembly, and thus to fold the carcass ply on to itself in order to trap the reinforcing bead core 4, 5 in the fold of the carcass ply thus formed. This provides, notably, a particularly strong fastening of the carcass ply, or carcass plies if the carcass assembly 2 comprises a plurality of superimposed carcass plies, to each reinforcing bead core 4, 5.

It should be noted that roller pressing using a pressure roller 11, 12, 13 is a particularly effective means of pressing the end section 3A, 3B against the inner face 3_in of the wall 3, and more particularly against the inner face 3C_in of the central section 3C, and of expelling any air that may be trapped between the end section 3A, 3B and the inner face 3_in of the wall 3. Thus, by means of roller pressing the radially inner face 3A_in, 3B_in of the end section may be made to adhere perfectly to the radially inner face 3C_in of the central section, in a regular assembly that is free of defects.

It should also be noted that, depending on the dimensions and stiffness of the end section 3A, 3B, it may be feasible to carry out the complete roller pressing of the end section either in one pass or in several successive passes.

If the option of a number of successive passes is chosen, a first pass will be carried out initially, to fold the end section 3A, 3B over the whole of its circumference about the roll axis X3, but only partially in a pitching movement around the reinforcing bead core 4, 5, in order to avoid causing any tearing of the end section 3A, 3B. The first pass will therefore consist in repeating the tilting pitching movement MT as many times as required in as many angular working sectors A11, A12, A13 as required to ensure that the total of angular working sectors A11, A12, A13 processed corresponds to at least one full revolution around the roll axis X3. One or more subsequent passes are then executed, in each of which, in all the angular sectors required to cover a new full revolution about the roll axis in each pass, tilting pitching movements MT are repeated and extend farther in pitch travel in each new pass, so as to accentuate the folding of the end section 3A, 3B in the successive passes, until, in the final pass, the radially inner face 3A_in of the end section is made to adhere to the radially inner face 3_in of the wall 3, and more precisely to the radially inner face 3C_in of the central section 3C.

Evidently, the size of the angular working sectors, that is to say the angular extent of the angular working sector or sectors A11, A1, A13 about the roll axis X3, must be relatively small, that is to say must represent a relatively small fraction of the circumference of the wall 3 and therefore of the circumference of the reinforcing bead core 4, 5, so that the tilting pitching movement MT executed by the pressing member 11, 12, 13 generates a folding force which is orientated so as to be contained, or practically contained, in a radial plane, without, or practically without, any force component in the circumferential direction.

For this purpose, each angular working sector A11, A12, A13 attached to a pressing member 11, 12, 13 preferably represents a fraction of less than 1/10, less than 1/20, less than 1/30 or even less than 1/45 of the circumference of the end section 3A, 3B; that is to say its measurement is preferably less than 36 degrees, less than 18 degrees, less than 12 degrees or even less than 8 degrees about the roll axis X3. According to a preferred possible embodiment, the measurement of the angular working sector A11, A12, A13, or of each of these sectors, is between 1 and 5 degrees.

Additionally, when a plurality of pressing members 11, 12, 13 is used, each occupying a separate angular working sector A11, A12, A13, the cumulative angular coverage of the angular working sectors, that is to say the sum of the respective individual angular coverages of each of the angular working sectors, represents a fraction of the circumference of the end section 3A, 3B about the roll axis X3, being more preferably less than 60 degrees, less than 30 degrees, or even less than 15 degrees. Thus, on each iteration, only the fraction of the circumference of the end section 3A, 3B covered by the angular working sector or sectors A11, A12, A13 is subjected to active folding by the pressing member or members 11, 12, 13, the rest of the circumference of the end section 3A, 3B not being affected in the iteration concerned.

The width W11, W12, W13 of the pressing member 11, 12, 13, over which the pressing member is applied to the portion of the circumference of the end section 3A, 3B assigned to it, and which therefore, in this case, more preferably corresponds to the width of the pressure roller 11, 12, 13 measured along the central axis Y11, Y12, Y13 of the roller, may be adapted according to the diameter of the carcass assembly 2, and is preferably in the range from 10 to 15 mm.

It should also be noted that, as may be seen in FIG. 1, the system 1 may comprise two folding devices 10, 110, preferably similar in their design and operation, one folding device 10, 110 being provided for each reinforcing bead core 4, 5, so that the two opposed end sections 3A, 3B of the wall 3 can advantageously be folded simultaneously on to the central section 3C of the wall in the same cycle.

For convenience of description, reference will be made to a single folding device 10 in the following text, although evidently the considerations relating to the folding device 10 may be transposed as appropriate to the other folding device 110.

According to a possible embodiment, the folding device 10 may comprise a single pressing member 11, and more particularly a single pressure roller 11, as shown in FIGS. 1 and 2, and may therefore process only one angular working sector A11 at a time.

Figures 18, 19:
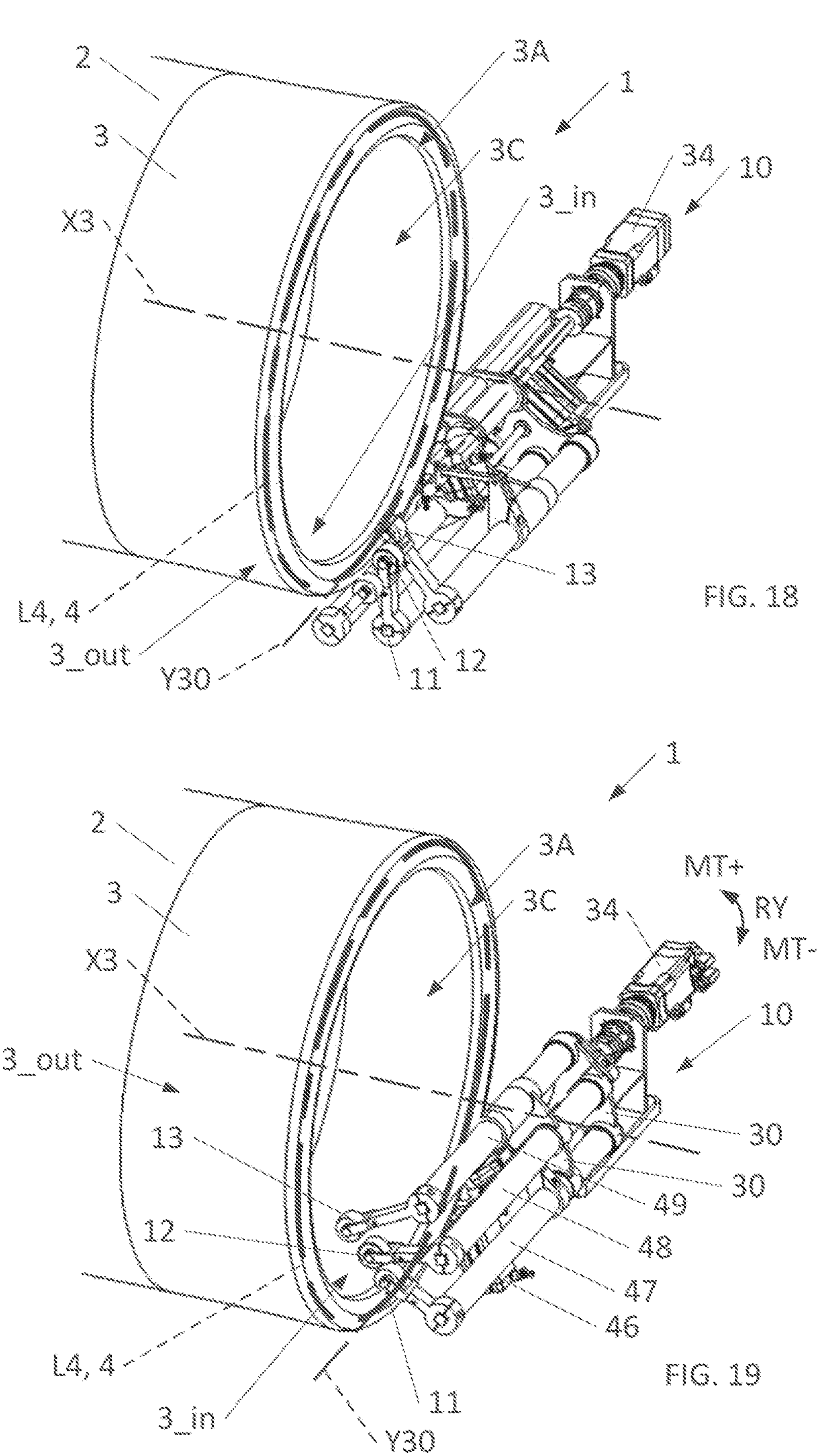
FIG. 18 shows, in a perspective view, the system of FIG. 15 with the three pressure rollers in a working configuration, and in the starting position of the tilting pitching movement.
FIG. 19 shows, in a perspective view, the system of FIG. 17 with the three pressure rollers in the arrival position of the outward phase of the tilting pitching movement.

However, according to another possible embodiment which is preferable, the folding device comprises, as may be seen notably in FIGS. 3, 5 and 18, a plurality of pressing members 11, 12, 13, more preferably a plurality of pressure rollers 11, 12, 13 in this case, which are angularly offset from one another in azimuth about the roll axis X3, so as to engage with the radially outer face 3A_out, 3B_out of the end section 3A, 3B in the various angular working sectors A11, A12, A13 located successively around the roll axis X3 along the generatrix L4, L5 of the reinforcing bead core 4, 5, as may be seen, notably, in FIG. 5.

Advantageously, because of this multiplication of the pressing members 11, 12, 13 distributed around the roll axis X3, and therefore, to some degree, offset in their rolling motion relative to one another about the roll axis X3, the system 1 is able to process a plurality of working sectors A11, A12, A13 simultaneously, at the same axial end of the wall 3, that is to say around the same reinforcing bead core 4, 5, by executing tilting pitching movements MT of the various pressing members 11, 12, 13 simultaneously in each of the angular working sectors A11, A12, A13. Thus the various pressing members 11, 12, 13 operate in concurrent time relative to one another. Consequently, fewer iterations are required to fold the end section 3A, 3B over a full revolution about the roll axis X3, thus reducing the corresponding cycle time, that is to say the duration of one pass, overall.

If necessary, provision could be made, according to one embodiment, for each of the plurality of pressing members 11, 12, 13 to follow, each in its own angular working sector A11, A12, A13, an identical angular pitch travel, starting from the same pitch starting position relative to the directrix L4, L5 of the reinforcing bead core and arriving at the same pitch arrival position as the pressing member immediately adjacent to it, so that each pressing member 11, 12, 13 would operate with exactly the same folding amplitude as the other pressing members.

In such a case, it could be advantageous to distribute the pressing members in an equal manner about the roll axis X3, for example at 120 degrees to one another in the case of three pressing members, so as to obtain the equivalent of one folding pass over a full revolution of the end section 3A, 3B about the roll axis X3, after each pressing member 11, 12, 13 has been made to process enough angular working sectors to cover the equivalent of 1/N of a revolution about the roll axis X3, where N denotes the number of pressing members.

On the other hand, if a single pass is not sufficient to fold the end sector 3A, 3B by pitching about the generatrix L4, L5 of the reinforcing bead core 4, 5 in this embodiment, then a similar supplementary pass would have to be repeated as often as required over 1/N of a revolution about the roll axis X3, while offsetting the pitch arrival position (and the pitch starting position if necessary) of the pressing members 11, 12, 13 in each new pass, so as to increase the folding action in each new pass.

Figures 15, 16, 17:
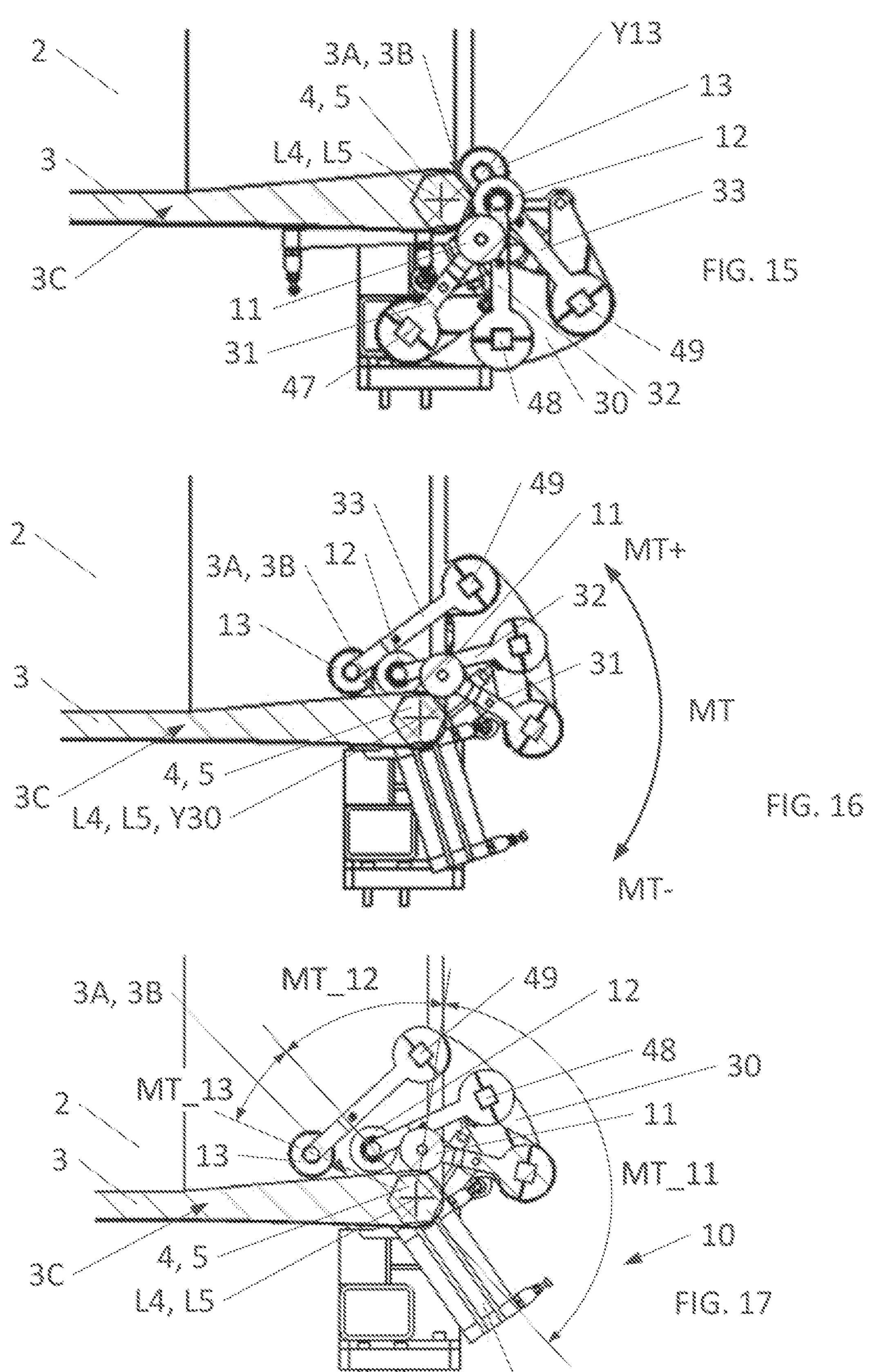
FIG. 15 shows, in the same sectional view, the system of FIGS. 10 to 14 in the starting position of the tilting pitching movement, this time with the first, second and third pressure rollers all in a working configuration, and in the starting position of the tilting movement.
FIG. 16 shows, in the same sectional view, the system of FIG. 15 in the course of the tilting pitching movement, during the outward phase.
FIG. 17 shows, in the same sectional view, the system of FIGS. 15 and 16 after the end of the execution of the outward phase of the tilting pitching movement, the first, second and third pressure rollers thus each being in their respective arrival positions, after each of them has folded the portion of the end section assigned to it, in their respective angular sectors.

According to another preferred embodiment, which may be preferred to the preceding one, notably, because the embodiment permits a particularly compact arrangement of the plurality of pressing members 11, 12, 13 and of the folding device 10 more generally, and ensures the effectiveness and progressiveness of the folding of the end section 3A, 3B, the plurality of pressing members 11, 12, 13 have pitch travel ranges about the generatrix L4, L5 that are complementary to one another, so that each pressing member 11, 12, 13 increases in turn, by its own contribution MT_11, MT_12, MT_13, the folding of the end section 3A, 3B over and around the reinforcing bead core 4, 5 towards the radially inner face 3_in of the wall 3 of the carcass assembly 2, as may be seen, notably, in FIG. 17.

In other words, the pitch arrival positions of the various successive pressing members 11, 12, 13 are advantageously offset in pitch relative to one another about the directrix L4, L5, in the direction of the tilting pitching movement MT towards the inner face 3_in of the wall, so that the respective angular pitch travels of the pressing members 11, 12, 13 around the reinforcing bead core 4, 5 are also offset relative to one another, so that each pressing member 11, 12, 13 moves farther in pitching towards the inside of the wall 3 than the pressing member 11, 12, 13 preceding it about the roll axis, and therefore moves more closely towards the end section 3A, 3B of the radially inner face 3C_in of the central section 3C.

Preferably, the same also applies to the starting positions of the pressing members 11, 12, 13; that is to say, the pitch starting positions of the pressing members are, just like the pitch arrival positions, offset in pitch from one another about the directrix L4, L5 in the direction of the tilting pitching movement MT towards the inner face 3_in of the wall, so that the starting position of a pressing member 12, 13 is closer to the inside of the central section 3, along the trajectory imparted by the tilting pitching movement MT, than the starting position of the pressing member 11, 12 preceding it.

The total available angular pitch travel about the generatrix L4, L5 may therefore be relatively large, and may advantageously be divided into the same number of pitch "sub-travels" as the number of pressing members 11, 12, 13. Thus it is possible to execute a progressive but complete folding of the end section 3A, 3B around the reinforcing bead core 4, 5 within a single folding pass, that is to say in the course of a single full revolution about the roll axis X3, until the end section 3A, 3B is entirely pressed against the radially inner face 3C_in of the central section 3C along the whole circumference of the end section 3A, 3B, and along the whole axial length of the end section 3A, 3B from the reinforcing bead core 4, 5 to the edge of the end section 3A, 3B, The multiplication of the pressing members 11, 12, 13 offset in rolling in this way advantageously makes it possible to cumulate the working travels of the pressing members within a single pass, and thus to benefit from a total pitch travel which is particularly long and, in particular, is sufficient to fold the end section 3A, 3B completely and correctly, even if this section has a considerable axial length.

Advantageously, each pressing member 11, 12, 13 operates in its own angular working sector A11, A12, A13 only, and acts on the corresponding portion of the end section 3A, 3B along a pitch travel which corresponds solely to its own contribution MT_11, MT_12, MT_13.

Thus each of the pressing members 12, 13 that follows the first pressing member 11 executes, in turn, the folding operation executed by the preceding pressing member 11, 12, resuming the folding operation from the pitch position where the contribution MT_11, MT_12 of the preceding pressing member left off.

The folding operation is therefore advantageously progressive, and is consequently respectful of the end section 3A, 3B, which thus undergoes no tearing or creasing, while still allowing complete folding in a single pass, that is to say in a single full revolution of the pressing members 11, 12, 13 about the roll axis X3.

Furthermore, the subdivision of the total angular pitch travel permitted by the multiplication of the pressing members and the pitch offset of these members makes it possible to accept a relatively small individual pitch travel amplitude of each of the pressing members, thus minimizing the time required to execute each tilting pitching movement MT. In a cumulative manner, this therefore makes it possible to minimize the cycle time, that is to say the period required to execute the pass in question, and therefore, more generally, the period required to fold the end section 3A, 3B completely on to the inside of the wall 3.

It should be noted that the efficiency of the folding device 10, and of the system 1 more generally, is optimized when, for a set of several pressing members 11, 12, 13, a roll offset installation of the pressing members 11, 12, 13, for simultaneously processing a plurality of angular working sectors A11, A12, A13, is combined with a pitch offset installation about the generatrix 11, 12, 13, enabling the progressive and complete folding of the end section 3A, 3B to be executed in a single pass in a plurality of successive pitch steps, each executed in an angular working sector A11, A12, A13 by a corresponding one of the pressing members 11, 12, 13, according to the individual contribution MT_11, MT_12, MT_13 of the pressing member 11, 12, 13, which goes beyond the individual contribution made by the preceding pressing member.

Figures 10, 11, 12:
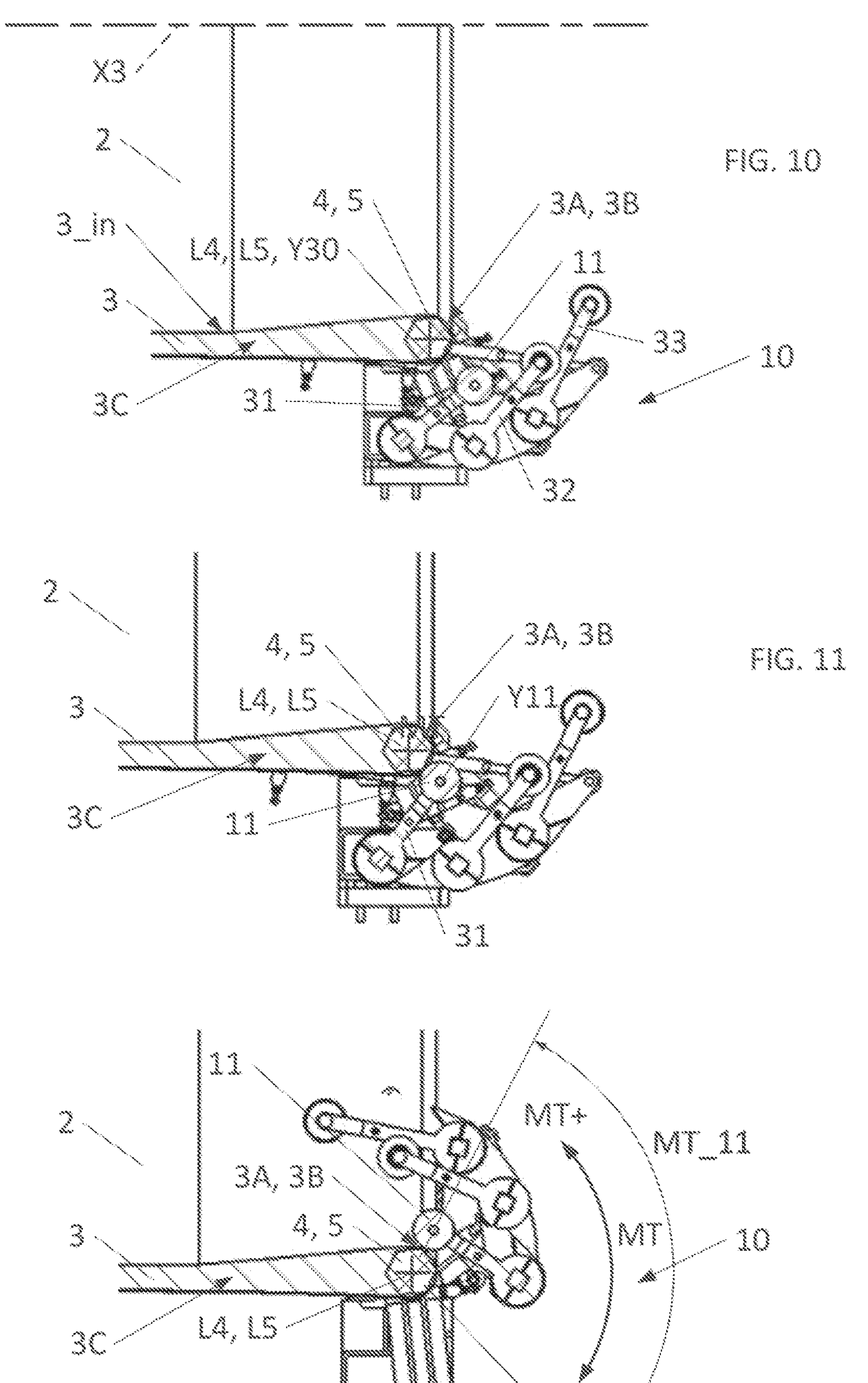
FIG. 10 shows, in a sectional view in a sagittal plane of the carcass which contains the roll axis and is normal to the pitch axis of the pressure rollers, the system of FIG. 4 with the three pressure rollers in a withdrawn configuration.
FIG. 11 shows, in the same sectional view as FIG. 10, the system of FIGS. 4 and 10 with the first pressure roller engaged in a working configuration, in the starting position of the tilting pitching movement, the second and third pressure rollers still being in a withdrawn configuration.
FIG. 12 shows, in the same sectional view, the system of FIG. 11 after the execution of the outward phase of the tilting pitching movement, the first pressure roller thus being in its arrival position after having folded the portion of the end section assigned to it.
Figure 13:
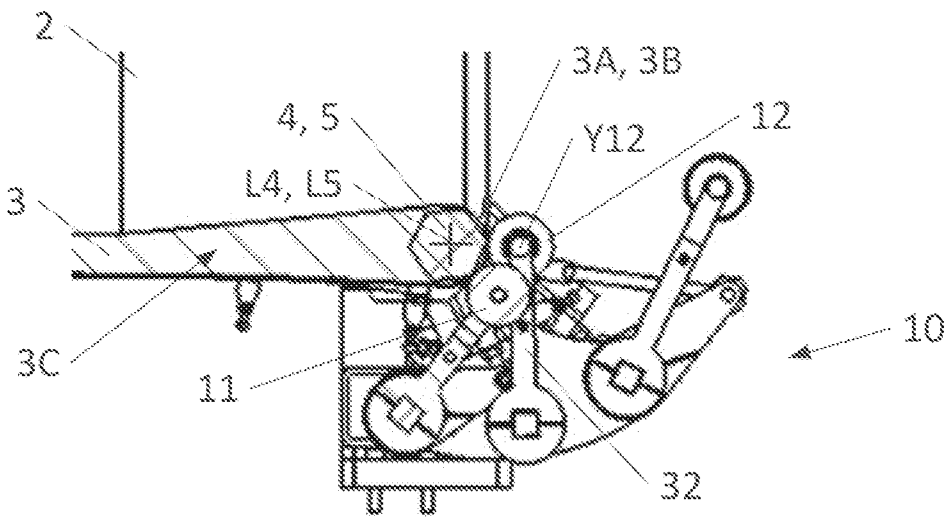
FIG. 13 shows, in the same sectional view, the system of FIGS. 10 to 12 in the starting position of the tilting pitching movement, this time with the first pressure roller and the second pressure roller in a working configuration, while only the third pressure roller remains in a withdrawn configuration.

Conventionally, in order to define the angular starting and arrival positions, and therefore the pitch travel amplitudes of the pressing members 11, 12, 13 and more particularly the individual contribution MT_11, MT_12, MT_13 of each pressing member 11, 12, 13, we may consider a reference plane called the "bisecting plane", corresponding to the radial plane containing on the one hand the roll axis X3 and on the other hand the bisector of the angular working sector A11, A12, A13 occupied by the pressing member 11, 12, 13 in question when the pressing member 11, 12, 13 is in its starting position, in contact with the end section 3A, 3B, which bisecting plane is therefore normal to the direction vector tangent to the generatrix L4, L5 and therefore to the circumferential direction at the point in question, and then take as the origin of a reference frame associated with the bisecting plane the point of intersection of the generatrix L4, L5 of the reinforcing bead core 4, 5 with the bisecting plane, and finally consider the angular position of the pressing member 11, 12, 13, considered to be the position, in the reference frame associated with the bisecting plane, of a chosen point of the pressing member in question 11, 12, 13, and more particularly of the intersection of the central axis Y11, Y12, Y13 of the pressure roller 11, 12, 13 with the bisecting plane, as shown, with reference to the first pressure roller 11 in this case, in FIGS. 12 and 17.

Preferably, the pressing member 11, and if appropriate each of the plurality of pressing members 11, 12, 13, provides, in its tilting pitching movement MT, an individual contribution MT_11, MT_12, MT_13 to the folding of the end section, which individual contribution MT_11, MT_12, MT_13 corresponds to an amplitude of angular movement of the pressing member 11, 12, 13 in question, in pitching about the generatrix L4 of the reinforcing bead core, which is at least equal to 30 degrees, or even at least 60 degrees, and preferably less than or equal to 120 degrees, for the pressing member or each pressing member 11, 12, 13 in question.

By providing an individual contribution of 30 degrees or more, the pitch travel, or portion of pitch travel, of the pressing member 11, 12, 13 in question, which enables the pressing member to be actively responsible for the effective folding of the end section 3A, 3B is sufficiently extended in pitch to provide a significant deflection and/or roller pressing action of the pressing member 11, 12, 13 on the end section 3A, 3B.

Also, by prioritizing an individual contribution of less than 120 degrees, the pitch travel of the pressing member still remains small enough to avoid causing the creasing, incorrect folding or even the tearing of the end section 3A, 3B that would occur in the angular working sector A11, A12, A13 in question, or possibly on the boundary between the angular working sector A11, A12, A13 and a neighbouring portion of the end section 3A, 3B that occupies an adjacent angular sector.

Preferably, the total individual pitch travels of each of the pressing members 11, 12, 13 will slightly overlap one another, so that the second pressing member 12 will come into contact with the outer face 3A_out, 3B_out of the end section in a pitch starting position located slightly upstream of the pitch arrival position of the first pressing member 11 in the direction of the tilting movement MT (in the anti-clockwise direction in FIGS. 6 to 17, in this case), and similarly the third pressing member 13 will come into contact with the end section 3A, 3B in a pitch starting position located slightly upstream of the pitch arrival position of the second pressing member 12 in the direction of the tilting movement.

This ensures that each pressing member 12, 13 resumes in an appropriate manner, with a certain margin of safety, the folding action executed by the pressing member 11, 12 that directly preceded it.

Preferably, the extent of the pitch overlap between the travels of two consecutive pressing members 11, 12, 13 may be in the range from 3 to 15 degrees, or preferably from 5 to 10 degrees, being equal to 5 degrees for example.

Consequently, the extent of the pitch overlap of a pressing member 11, 12, 13 with one and/or another of its neighbours, that is to say with one or another of the pressing member or members preceding it and/or following it immediately about the roll axis X3, is preferably strictly smaller than the individual contribution MT_11, MT_12, MT_13 of each pressing member; that is to say, within the individual angular travel covered by the roller from its starting position to its arrival position, the individual contribution of the roller represents at least 50%, preferably at least 75%, or even at least 90% of the angular distance (and therefore the extent of the overlap with the preceding roller represents less than 50%, preferably less than 25%, or even less than 10%, respectively).

Figures 6, 7, 8, 9:
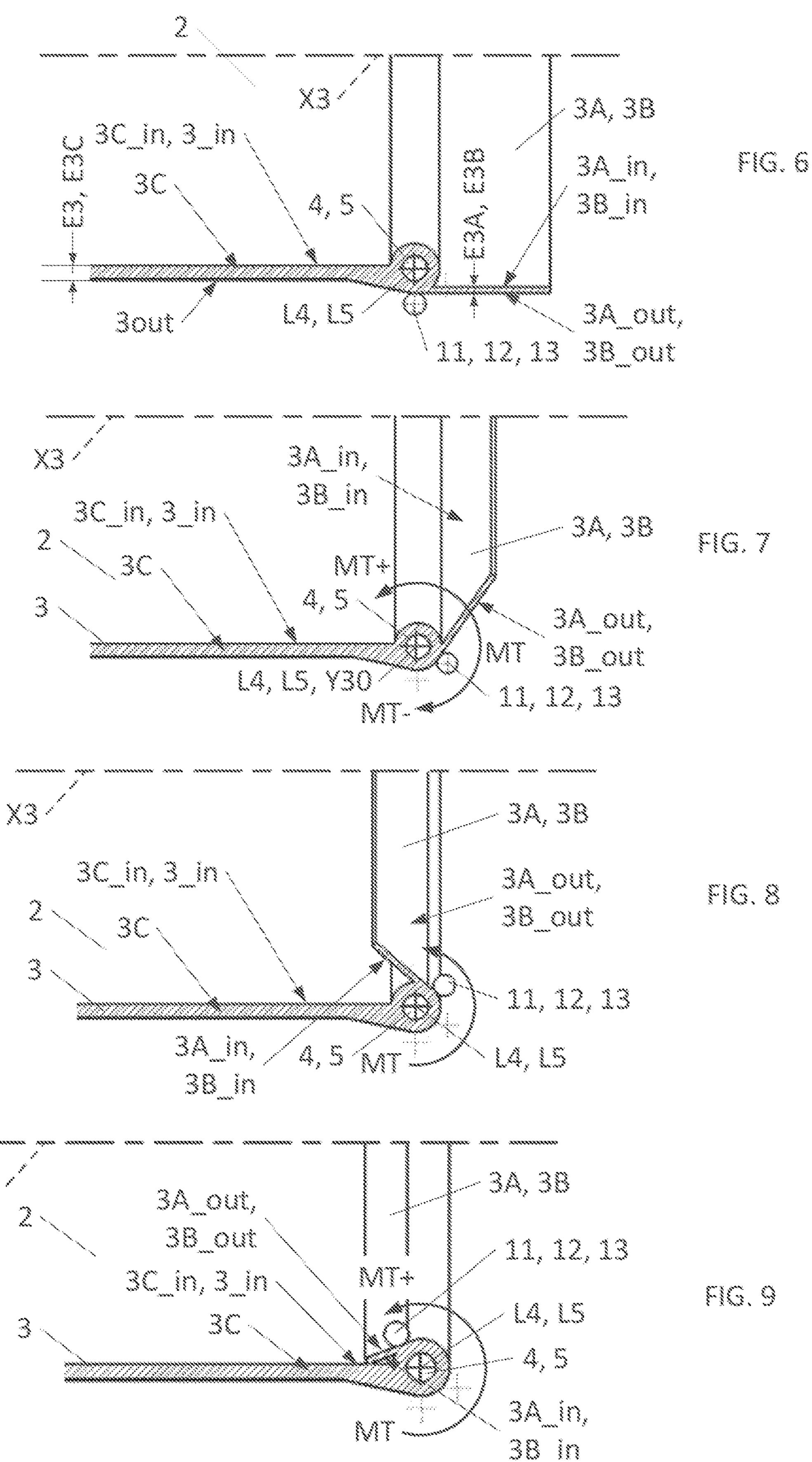
FIGS. 6, 7, 8 and 9 show, in sectional views taken along a sagittal plane of a carcass containing the roll axis, the successive steps of the progressive folding of the first end section of the wall of the carcass assembly, wherein the steps may be implemented by a number of successive passes executed using the same single pressure roller, or, preferably, in a single pass using a plurality of pressure rollers operating simultaneously through pitch travels which are complementary to one another.

By way of example, we may consider that the schematic views of FIGS. 6 to 9 apply to a folding device 10 comprising three pressure rollers 11, 12, 13, that, for the sake of convenience, these figures are all to be imagined as lying in the same bisecting plane, and that FIG. 6 shows the first pressure roller 11 in the starting position, which conventionally corresponds to a "zero degrees" pitch position in the reference frame associated with the bisecting plane, while FIG. 7 shows the first pressure roller 11 in the arrival position, so that the difference in position of the first pressure roller 11 between FIGS. 6 and 7 corresponds to the individual contribution MT_11 of the first pressure roller 11. Similarly, we may consider that FIG. 8 shows the second pressure roller 12 in the arrival position, so that the difference in pitch position of the pressure roller 11, 12 about the generatrix L4, L5 between FIGS. 7 and 8 corresponds to the individual contribution MT_12 of the second pressure roller, and that, finally, FIG. 9 shows the third pressure roller 13 in an arrival configuration, so that the difference in position of the pressure roller 12, 13 between FIGS. 8 and 9 corresponds to the individual contribution MT_13 of the third pressure roller 13.

In this example, it may be provided that:

- the starting position of the first pressure roller 11 is located at zero degrees in pitch, and the arrival position of the first pressure roller 11 is located at 60 degrees in pitch (in the anti-clockwise direction of the tilting pitching movement MT in this case),
- while the starting position of the second pressure roller 12 is located at 55 degrees in pitch (that is to say, 5 degrees upstream of the arrival position of the first pressure roller 11) and the arrival position of the second pressure roller is located at 125 degrees,
- the starting position of the third pressure roller 13 is located at 120 degrees (that is to say, 5 degrees upstream of the arrival position of the second pressure roller 12) and the arrival position of the third (and last, in this case) pressure roller 13 is located at 215 degrees.

In such a configuration, the individual contribution MT_11 of the first pressure roller 11 will therefore be 60 degrees (the arrival position of the first pressure roller 11, minus the starting position of the first pressure roller 11=60−0 degrees), the individual contribution MT_12 of the second pressure roller 12 will be 65 degrees (arrival position of the second pressure roller 12, minus the arrival position of the first pressure roller 11 preceding it=125−60 degrees), and the individual contribution MT_13 of the third and last pressure roller 13 will be 90 degrees (the arrival position of the third pressure roller 13, minus the arrival position of the second pressure roller 12=215−125 degrees).

The overlap in pitch between the second pressure roller 12 and the first pressure roller 11 will then be 5 degrees (=60−55 degrees), and the overlap in pitch between the third pressure roller 13 and the second pressure roller 12 will also be 5 degrees (=125−120 degrees).

Evidently, the values of the aforethe arrival positions, and if appropriate the corresponding values of the starting positions determined with respect to the arrival positions with allowance for the desired overlap, may be adjusted, for example by +/−30 degrees or +/−15 degrees with respect to the aforementioned nominal values, in accordance, notably, with the axial length of the end section 3A, 3B to be folded.

Preferably, the folding device 10 is arranged so as to cause the pressing member 11, 12, 13 to execute, in the angular working sector A11, A12, A13, an outward tilting pitching movement MT (denoted MT+) and a return tilting pitching movement (denoted MT−) about the generatrix L4, L5 of the reinforcing bead core 4, 5, from a pitch starting position (FIGS. 11, 13, 15 and 18) to a pitch arrival position (FIGS. 12, 14, 17 and 19), and then in reverse, from the pitch arrival position (FIGS. 12, 14, 17 and 19), to return to the pitch starting position (FIGS. 11, 13, 15 and 18).

Advantageously, the use of a reciprocating tilting pitching movement makes it possible, firstly, to return the pressing member 11, 12, 13, or each pressing member 11, 12, 13, to its pitch starting position about the generatrix L4, L5 of the reinforcing bead core 4, 5 in the angular working sector in question, before repositioning the pressing member in front of another angular sector of the wall 3, so that the pressing member is automatically ready to repeat its tilting pitching movement MT in exactly the same manner as soon as it is placed facing a new angular working sector of the wall 3. The operation of the folding device 10 is thus completely reproducible for an infinite number of times, that is to say for as many times as required for each pressing member 11, 12, 13.

Furthermore, the use of a reciprocating tilting pitching movement enables the same pressing member 11, 12, 13 to execute, in the same angular working sector A11, A12 A13, and therefore on the same portion of the end section 3A, 3B, two successive passes, namely one outward pass MT+ (in the anti-clockwise direction in FIGS. 6 to 17 in this case), and one return pass MT− (in the clockwise direction in FIGS. 6 to 17 in this case), thereby providing a double roller pressing action, one in each direction, and thus improving the quality of the adhesion of the end section 3A, 3B to the reinforcing bead core 4, 5 and then to the central section 3C, notably by comparison with a tilting movement having only one pass (even if such a variant embodiment may be theoretically feasible).

It should also be noted that, in order to ensure that the pressing member 11, 12, 13 compresses the end section 3A, 3B in a satisfactory way against the reinforcing bead core 4, 5 and the central section 3C, the pressing member 11, 12, 13 is preferably pressed into contact with the end section 3A, 3B, and more precisely into contact with the radially outer face 3A_out, 3B_out of the latter, using an elastic member 35 that can provide pre-loading. This elastic member 35 may, for example, take the form of a spring, or preferably, as detailed below, a pneumatic actuator 44, 45, 46.

According to the disclosure, the system 1 also comprises a drive device 20 designed to modify, by successive angular increments, the relative position of the pressing member 11, 12, 13 with respect to the carcass assembly 2 about the roll axis X3, so that the pressing member 11, 12, 13 can execute its tilting pitching movement MT successively in the various angular working sectors A11, A12, A13 to fold the corresponding portions of the end section 3A, 3B, one after another.

Thus each pressing member 11, 12, 13 may travel, step by step and angular increment by angular increment, around the full circumference of the end section 3A, 3B about the roll axis X3, so as to repeat its tilting pitching movement MT on each angular increment, and therefore in each new angular working sector of the wall 3 presented to the pressing member 11, 12, 13, until the cumulation of angular sectors successively processed by the same pressing member 11, 12, 13 reaches or exceeds a complete revolution (that is to say, at least 360 degrees) about the roll axis X3, corresponding to a full folding pass. If a plurality of folding passes are required, the process could be repeated over a plurality of complete revolutions about the roll axis X3, each additional revolution corresponding to an addition pass.

It is be possible to envisage a number of variant embodiments of the drive device 20, which may, in a first variant, move the pressing member or members 11, 12, 13 in rolling rotation about the roll axis X3 relative to a fixed carcass assembly 2, or, in a second variant, actively move the pressing member or members 11, 12, 13 as well as the carcass assembly 2 in rotation about the roll axis X3, or finally, in a third variant, move the carcass assembly 2 in rotation RX about itself around the roll X3, facing pressing members 11, 12, 13 occupying fixed positions, that is to say unvarying positions, in azimuth about the roll axis X3.

The first and second variants could, notably, be implemented by making the at least one (or each) pressing member 11, 12, 13 by carried by a robot arm 60 that would carry the pressing member 11 at its end, and that would be capable of executing equally well i) incremental angular rolling movements of the pressing member 11, 12, 13 with respect to the carcass assembly 2, about the roll axis X3, in order to change the angular working sector pressing member and cause the pressing member 11, 12, 13 to travel by angular increments through a full revolution, or even several full revolutions if necessary, about the roll axis x3, or ii) tilting pitching movements MT of the pressing member about the generatrix L4, L5 of the reinforcing bead core 4, 5, in each successive angular working sector A11, A12, A13 in question.

Figure 20:
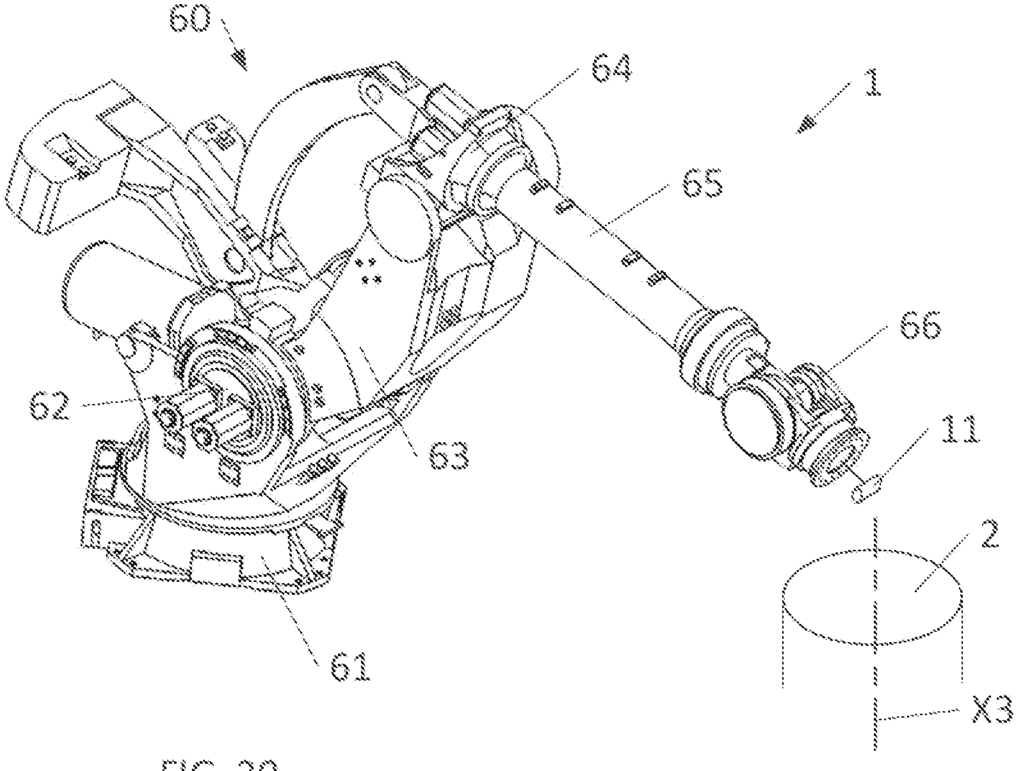
FIG. 20 shows, in a perspective view, a variant of the system according to the disclosure, using an anthropomorphic robot arm to provide the various movements of the pressing member relative to the carcass assembly, that is to say to provide, alternately, the tilting pitching movement of the pressing member in an angular working sector, and then the incremental angular movement of the pressing member about the roll axis, to transfer the pressing member to the next angular working sector.

The robot arm 60 may preferably be a six-axis anthropomorphic robot which, in the way known per se, comprises, as visible in FIG. 20, a base 61 bearing a first joint 62 referred to as the "shoulder", forming a connection having at least two mutually orthogonal pivot axes, followed by a first segment 63 referred to as the "arm", which bears a second joint 64 referred to as the "elbow", preferably comprising at least one pivot axis so as to allow angular excursion of a second segment 65 referred to as the "forearm", the terminal end of which bears a third joint 66 referred to as the "wrist" which is able to move about three pivot axes in mutually orthogonal pairs, one of which coincides with the longitudinal axis of the forearm 65. The pressing member 11, 12, 13 is advantageously fixed to the wrist 66.

However, the third variant, consisting in moving the carcass assembly 2 in rotation about itself around the roll axis X3 facing pressing members 11, 12, 13 which occupy fixed positions in azimuth about the roll axis X3, will be preferred, in order to simplify the structure of the system 1 and improve the reproducibility of the movements, as well as the robustness and precision of the system 1.

To this end, the drive device 20 preferably comprises, as is visible in FIG. 1, a receiving support 21 which is mounted on a frame 22 and is arranged to receive the carcass assembly 2 and to drive the carcass assembly 2 in rotation RX relative to the frame 22, by successive angular increments about the roll axis X3.

Advantageously, the drive device 20 can thus cause the successive sections making up the reinforcing bead core 4, 5 to pass across the pressing member 11, or across each pressing member 11, 12, 13, along the generatrix L4, L5 by angular increments that enable the carcass assembly 3 to be moved step by step in a rotation RX, referred to as a "roll rotation", about the roll axis X3, and therefore enable the reinforcing bead core 4, 5 and the associated end section 3A, 3B to be moved jointly about the roll axis X3 in the circumferential direction.

The drive device 20 may comprise guide rollers 23 which support the carcass assembly 2 and drive it by friction. At least one of the guide rollers 23 is driven by means of a roll drive motor 24, preferably in the form of an electric motor.

Preferably, the roll axis X3 is horizontal, and the drive device 20 comprises at least two pairs of guide rollers 23, with one pair in radial line with each reinforcing bead core 4, 5 and bearing against the radially outer face 3 out of the wall 3.

The centre distance of the guide rollers 23 of each pair can preferably be adjusted according to the diameter of the carcass assembly 2.

The guide rollers 23 may preferably have a shoulder for blocking the axial translation of the carcass assembly 2 along the roll axis, as is visible in FIG. 1.

After each angular increment in rotation RX about the roll axis X3, the drive device 20 stops the roll rotation movement in order to keep the carcass assembly 2 stationary in roll while the pressing member or members 11, 12, 13 execute their tilting pitching movement MT around the reinforcing bead core 4, 5, in order to fold the end section 3A, 3B in their respective angular working sectors A11, A12, A13. When the tilting pitching movement MT has been executed, the drive device 20 resumes the rotation RX about the roll axis X3 in order to move the carcass assembly 2 by an angular increment, and thus modify the position of the wall 3 of the carcass assembly 2 with respect to the position of the pressing members 11, 12, 13 about the roll axis X3, this being equivalent to placing each pressing member 11, 12, 13 in a new angular working sector. The roll rotation RX of the carcass assembly 2 is then interrupted again to enable the pressing member or members 11, 12, 13 to execute a new tilting pitching movement MT around the bead core in their new angular working sectors A11, A12, A13, and so on.

The roll rotation RX of the carcass assembly 2 takes place advantageously in the direction which drives the wall 2 of the first pressing member 11 towards the second and then the third pressing member 12, 13, that is to say in the direction enabling the same portion of the circumference of the end section 3A, 3B to move from one advantageously to another, in such a way that the pitch folding of the portion of the end section 3A, 3B is intensified with each new intervention by a pressing member 11, 12, 13.

The value of the angular increment is chosen, notably, according to the diameter of the carcass assembly 2 and the length of the arc covered by the pressing member 11 about the roll axis X3 (and therefore according to the value of the angular working sector A11). This value of angular increment therefore represents a fraction, strictly less than 1, of the circumference of the reinforcing bead core 4, 5 about the roll axis X3.

Preferably, the angular increment represents a fraction of the circumference of the reinforcing bead core 4, 5 (or, in an equivalent manner, a fraction of the length of the generatrix L4, L5) which is smaller than or equal to 3.33% (that is to say, substantially a fraction equal to 12/360 degree), preferably in the range from 0.25% (corresponding to approximately 1/360 degree) to 1.4% (corresponding to approximately 5/360 degree).

The angular increment is preferably substantially equal to the extent of the angular working sector A11, or if appropriate the smallest of the angular working sectors A11, A12, A13.

For example, the value of the angular increment may be in the range from 75% to 120% of the smallest size of the angular working sectors A11, A12, A13, or, if the angular working sectors A11, A12, A13 are preferably all of the same size, from 75% to 120% of the common size of the angular working sectors A11, A12, A13. In this connection, it should be noted that a value of less than 100% permits the provision of redundant folding, since the same pressing member 11, 12, 13 will operate successively in successive angular working sectors that partially overlap in pairs, whereas a value of 100% enables the pressing member 11, 12, 13 to be shifted angularly at each increment by the exact value of the angular sector that it has just processed, so that the pressing member successively processes successive angular working sectors A11, A12, A13 that are adjacent to one another.

For guidance, the value of the angular increment by which the cylindrical wall 3 of the carcass assembly 2 is shifted at each iteration, relative to the pressing member 11, 12, 13 in question, about the roll axis X3 may preferably be less than 12 degrees, or more preferably in the range from 1 to 5 degrees.

Preferably, the angular increment is identical at each iteration.

Also preferably, the angular increment will be, for any given iteration, and preferably for each iteration of the same revolution about the roll axis X3, the same for all the various pressing members 11, 12, 13. This will advantageously be the case in all circumstances, being determined by the construction, when use is made of a receiving support 21 which drives the carcass assembly 2 in roll rotation RX in a simultaneous and identical manner for the various pressing members 11, 12, 13 distributed in fixed positions about the roll axis X3.

Preferably, and particularly in combination with a receiving support 21 as described above, capable of driving the carcass assembly in rotation about the roll axis X3, the folding device 10 may comprise a tilting base 30 carrying an arm 31, 32, 33 supporting the pressing member 11, 12, 13, which tilting base 30 is mounted for rotation RY relative to the frame 22 about an axis Y30 called the "pitch axis" Y30, which is transverse, and preferably orthogonal, to the roll axis X3, and which embodies the axis about which the tilting pitching movements MT of the pressing member 11, 12, 13 take place, as is visible, notably, in FIGS. 1 and 2.

Advantageously, such an arrangement will be particularly simple, compact and robust.

Preferably, the pitch axis Y30 is contained in a plane normal to the roll axis X3, and is tangential to the generatrix L4, L5 of the reinforcing bead core 4, 5 in question.

The pitch rotation RY of the tilting base 30 may be provided by a pitch drive motor 34, preferably in the form of an electric motor. The motor 34 may, notably, provide the alternating reciprocating pitch movement MT+, MT− mentioned above.

The arm 31, 32, 33 may preferably take the form of a fork carrying the central axis Y11, Y12, Y13 of rotation of the pressing member 11, 12, 13 in question.

According to a preferred characteristic, which may constitute a complete separate disclosure, the arm 31, 32, 33 carrying the pressing member 11, 12, 13 may have a degree of freedom in differential pitch rotation relative to the tilting base 30, this differential pitch rotation, on the one hand, taking place about the pitch axis Y30, or preferably about an axis parallel to the pitch axis Y30 and separate from the pitch axis Y30, and, on the other hand, being dependent on an elastic member 35, 44, 45, 46.

Advantageously, by providing the arm 31, 32, 33 carrying the pressing member 11, 12, 13 with a certain degree of freedom in differential pitch rotation relative to the tilting base 30, under the control of the stiffness of the elastic member 35, 44, 45, 46, it is possible, on the one hand, for the pressing member 11 to be suspended elastically in order to apply an elastic pre-stress to the end section 3A, 3B, and, on the other hand, for the folding device 10 to adapt, during the tilting pitching movement MT, to the trajectory that the profile of the end section 3A, 3B imposes on the pressing member 11, 12, 14 when the end section 3A, 3B is placed on the reinforcing bead core 4, 5 and then on the radially inner face 3C_in of the central section 3C.

The differential pitch rotation axis may, for example, take the form of a shaft 47, 48, 49 which is mounted movably in rotation on the base 30, if necessary between two stops which limit its differential rotational travel to less than one revolution, or possibly less than one half-revolution or even less than a quarter of a revolution, and to which shaft is fixed the arm 31, 32, 33, which preferably extends perpendicularly to the shaft and therefore, preferably, perpendicularly to the differential pitch rotation axis.

As mentioned above, the elastic suspension of the arm 31, 32, 33 may be provided by any suitable elastic member 35, for example a spring, such as a torsion spring interposed between the base 30 and the shaft 47, 48, 49 in question, or between the shaft 47, 48, 49 and the arm 31, 32, 33 in question. According to a particularly preferred possible arrangement, the elastic suspension of the arm 31, 32, 33 is provided by a pneumatic actuator 44, 45, 46, for example a pneumatic actuator which acts on the shaft 47, 48, 49 via a crank 41, 42, 43.

It would theoretically be possible to dissociate the various pressing members 11, 12, 13 so that the tilting pitching movement MT of each pressing member could be controlled and executed separately.

However, according to a preferred characteristic which may constitute a completely separate disclosure, and as visible in FIGS. 3, 18 and 19, the plurality of pressing members 11, 12, 13 are carried by the same tilting base 30, so that the rotation RY, in this case the pitch rotation RY, of the tilting base 30 drives the plurality of pressing members 11, 12, 13 jointly in their tilting pitching movement MT about the reinforcing bead core 4, 5.

Advantageously, the various pressing members 11, 12, 13, in this case the three pressure rollers 11, 12, 13, can thus execute their tilting pitching movement MT simultaneously, together, by means of a single pitch drive motor 34 and a shared base 30, thereby yielding savings in terms of materials, space and energy, and facilitating the coordination, in this case the synchronization, of the pressing members 11, 12, 13.

Advantageously, the individual arrangement of the first pressing member 11, and particularly its mounting on an arm 31 forming an elastically pre-stressed fork, may be duplicated in the second pressing member 12 and in the third pressing member 13, thus providing, on the one hand, offsetting of the pressing members 11, 12, 13 along the pitch axis Y30, so that the pressing members 11, 12, 13 each cover a different angular working sector A11, A12, A13, as is clearly visible in FIG. 5, and, on the other hand, a basic and preferably permanent offsetting of the position and pitch orientation, in the bisecting plane, of the respective arms 31, 32, 33 carrying the pressing members 11, 12, 13, so as to impart to each carrying member its individual contribution MT_11, MT_12, MT_13 to the folding, as is visible, notably, in FIGS. 3 and 15 to 17.

This advantageously provides a complementarity of action of the pressing members both in roll, in multiple angular working sectors A11, A12, A13, and in pitch, by individual contributions MT_11, MT_12, MT_13, each of which, in turn, intensifies the folding of the end section 3A, 3B.

According to the disclosure, the system 1 further comprises a selector 40 which is designed to put the pressing member 11, 12, 13, alternately, into a working configuration, enabling the pressing member 11, 12, 13 to engage with the radially outer face 3A_out, 3B_out of the end section 3A, 3B in the angular working sector A11, A12, A13 in question and to force the folding of the corresponding portion of the end section 3A, 3B when the folding device 10 executes the tilting pitching movement MT in the angular working sector A11, A12, A13 in question, and then into a withdrawn configuration which prevents the pressing member 11, 12, 13 from interfering with the end section 3A, 3B when the drive device 20 modifies the relative position of the pressing member 11, 12, 13 with respect to the cylindrical wall 3 of the carcass assembly 2, about the roll axis X3, for the purpose of changing the angular working sector A11, A12, A13.

Advantageously, the selector 40 makes it possible, in particular, to disengage the trajectory followed by the wall 3 of the carcass assembly 2 during the pitch rotation RX of the carcass assembly, by moving away, between two successive tilting pitching MT and folding operations, the pressing members 11, 12, 13 that could obstruct the free rolling movement of the carcass assembly 2.

By way of illustration, FIGS. 3 and 10 show a phase in which all the pressing members 11, 12, 13 are in a withdrawn configuration, to enable the drive device 20 to put the carcass assembly into a roll rotation RX about the roll axis X3, in order to offset the carcass assembly 2 by an angular increment relative to the respective positions occupied by the pressing members 11, 12, 13 about the roll axis X3.

Conversely, FIGS. 15 and 18 show a phase in which all the pressing members 11, 12, 13 are in a working configuration, in contact with the end section 3A, 3B.

The selector 40 may comprise any appropriate mechanism, for example, and preferably, a linkage system comprising a crank 41, 42, 43 moved by an actuating device 44, 45, 46, such as an actuator 44, 45, 46, preferably a pneumatic actuator 44, 45, 46. The crank 41, 42, 43 drives a shaft 47, 48, 49 which is mounted movably in rotation on the tilting base 30, on an axis parallel to, or even coinciding with, the pitch axis Y30, and which carries the arm 31, 32, 33 carrying the pressing member 11, 12, 13 in question, as is clearly visible in FIGS. 2 and 3.

The whole of the linkage mechanism, and notably the corresponding actuating device 44, 45, 46, is preferably mounted on the tilting base 30.

Here again, it should be noted that the mechanism of the selector 40, which in this case comprises a crank 41, 42, 43, an actuating device 44, 45, 46 and a shaft 47, 48, 49, may preferably be duplicated in a substantially identical way for each pressing member 11, 12, 13, so as to provide each pressing member 11, 12, 13 with an autonomous selector mechanism, independent of those of the other pressing members.

Advantageously, by means of the selector 40, it is possible to prevent a pressing member 11, 12, 13 from rubbing against the end section 3A, 3B or from colliding with the end section 3A, 3B during the roll rotation RX of the carcass assembly 2, which would create a force orientated in the circumferential direction on the end section 3A, 3B that could crease or damage the end section 3A, 3B.

Advantageously, the selector 40 therefore enables the folding process to be broken down into an alternation of roll rotation movements RX on the one hand, for causing the pressing member or members 11, 12, 13 to progress by angular increments along the circumference of the reinforcing bead core 4, 5 and of the end section 3A, 3B, and tilting pitching movements RY, MT on the other hand, which enable the pressing members to fold the wall 3 of the carcass assembly 2 on to itself. Each type of movement (roll rotation RX on one hand, tilting pitching RY, MT on the other hand) is thus executed intermittently and exclusively, so that it is interrupted while the other type of movement is executed, thereby avoiding the simultaneous execution of both types of movement, and enabling the two types of movement to be linked together sequentially, and if necessary to be repeated sequentially in alternation with one another.

Preferably, the selector 40 comprises a pneumatic actuator 44 associated with the pressing member 11, or if necessary a plurality of pneumatic actuators 44, 45, 46, each associated with one of the plurality of pressing members 11, 12, 13, the pneumatic actuator 44, 45, 46 being arranged, on the one hand, to control the passage of the pressing member 11, 12, 13 associated therewith from the withdrawn configuration to the working configuration and vice versa, and, on the other hand, to provide, in a working configuration, pre-stressing and elastic suspension of the pressing member 11, 12, 13 in question against the end section 3A, 3B.

In fact it would theoretically be feasible to dissociate the switching function on the one hand, which makes it possible to change from the working configuration to the withdrawn configuration and vice versa, from the elastic pre-stressing function on the other hand, which makes it possible to push the pressing member against the end section 3A, 3B with a degree of force, in opposition to the resistance of the reinforcing bead core 4, 5 and the central section 3C of the wall 3 against which the end section 3A, 3B is made to bear, thus creating an adequate roller pressing force.

For this purpose, it would be possible to provide a selector 40 with a rigid mechanism, for example comprising an actuating device in the form of a hydraulic actuator or an electric motor, and to provide the elastic suspension by using another mechanical elastic member 35 such as a torsion spring interposed between the shaft 47, 48, 49 moved by the actuating device on the one hand, and the arm 31, 32, 33 carrying the pressing member 11, 12, 13 on the other hand.

In the interests of compactness, however, it is preferable to group these functions within a single member, namely a pneumatic actuator 44, 45, 46, making use of the compressibility of the compressed air, which compressed air is also used as the main means of actuating the rod of the actuator, thereby additionally providing the elastic suspension for the crank 41, 42, 43 and consequently for the shaft 47, 48, 49, for the arm 31, 32, 33 and therefore, in fine, for the pressing member 11, 12, 13.

Preferably, the system 1 comprises an automatic sequencer 50, preferably taking the form of an electronic control unit, and the sequencer 50 is programmed to execute and repeat, as often as required, until the end section 3A, 3B has been pressed along its whole circumference about the roll axis X3 against the radially inner face 3_in of the wall 3 of the carcass assembly 2, the following sequence, called the "elementary sequence":

- the selector 40 places at least one pressing member 11, 12, 13 in the working configuration;
- the folding device 10 causes the at least one pressing member 11, 12, 13 to execute a tilting pitching movement MT, preferably an outward movement MT+ and a return movement MT−, about the generatrix L4, L5 of the reinforcing bead core 4, 5, in the angular working sector A11, A12 A13 in question, so as to fold towards the radially inner face 3_in of the wall 3 of the carcass assembly 2 the portion of the end section 3A, 3B that is located in the angular working sector A11, A12, A13;
- the selector 40 places the at least one pressing member 11, 12, 13 back in the withdrawn configuration;
- the drive device 20 offsets the wall 3 of the carcass assembly 2 about the roll axis X3 by a chosen angular increment, relative to the at least one pressing member 11, 12, 13, so as to place the at least one pressing member 11, 12, 13 in a new angular working sector, separate from the preceding angular working sector A11, A12, A13 in question.

Advantageously, the sequencer 50 makes it possible to organize in a very reliable way the intermittent and alternating operation of the folding device 10 and of the drive device 20, and more particularly to automate the pass or passes required for the complete folding of the end section 3A, 3B.

According to a preferred characteristic which may constitute a completely separate disclosure, notably in combination with a system 1 comprising a receiving support 21 driving the carcass assembly 2 in roll rotation RX and a folding device comprising a tilting base 30 providing the tilting pitching movements MT of the pressing member or members relative to the carcass assembly 2, as described above, the pressing member 11, and if appropriate each pressing member 11, 12, 13, is formed by a pressure roller mounted rotatably on its central axis Y11, Y12, Y13, and the central axis Y11, Y12, Y13 is, and remains during the tilting pitching movement MT, substantially parallel, with an error of +/−10 degrees and preferably +/−5 degrees, and more preferably exactly parallel, to the normal to a radial plane called the "bisecting plane" which, as described above, contains the roll axis X3 as well as the bisector of the angular working sector A11, A12, A13 where the tilting pitching movement MT of the pressure roller 11, 12, 13 begins.

In other words, the central axis Y11, Y12, Y13 of the pressure roller is, and remains, substantially parallel to the tangent to the generatrix L4, L5 in the angular working sector A11, A12, A13 in which the pressure roller operates. More particularly, the central axis Y11, Y12, Y13 of the pressure roller is, and remains, substantially parallel to the pitch axis Y30, in that the orientation of the central axis Y11, Y12, Y13 never deviates, whether in the pitch starting position, in the pitch arrival position or during the tilting pitching movement MT, by more than 10 degrees, or preferably more than 5 degrees, from the direction of the normal to the bisecting plane, and therefore from the direction of the tangent to the generatrix L4, L5 at the point of intersection of the generatrix L4, L5 with the bisecting plane, and more particularly from the direction of the pitch axis Y30.

More preferably, the central axis Y11, Y12, Y13 of the roller is, and remains, exactly parallel to the normal to the bisecting plane, and more particularly exactly parallel to the pitch axis Y30; that is to say, it exhibits a zero deviation (zero degrees) from the direction of the normal to the bisecting plane, or from the direction of the pitch axis Y30.

Advantageously, the orientation of the pressure rollers 11, 12, 13, being quasi-tangential or even exactly tangential to the generatrix L4, L5 of the reinforcing bead core, makes it possible to provide a tilting pitching movement MT that corresponds substantially or even exactly to a rotary movement centred on the normal to the bisecting plane, so that each point on the pressure roller follows a trajectory which is virtually, or even exactly, contained in a plane parallel to the bisecting plane, and therefore in a radial or virtually radial plane, such that the tilting pitching movement MT of the pressure roller 11, 12, 13 therefore generates virtually no thrust component in the circumferential direction. This makes it possible to avoid twisting or creasing the end section 3A, 3B subjected to the roller pressing action, and in particular to avoid deflecting in the circumferential direction the reinforcing threads of the carcass ply or plies that are present in the end section 3A, 3B and that are therefore subjected to folding around the reinforcing bead core 4, 5.

Figure 4:
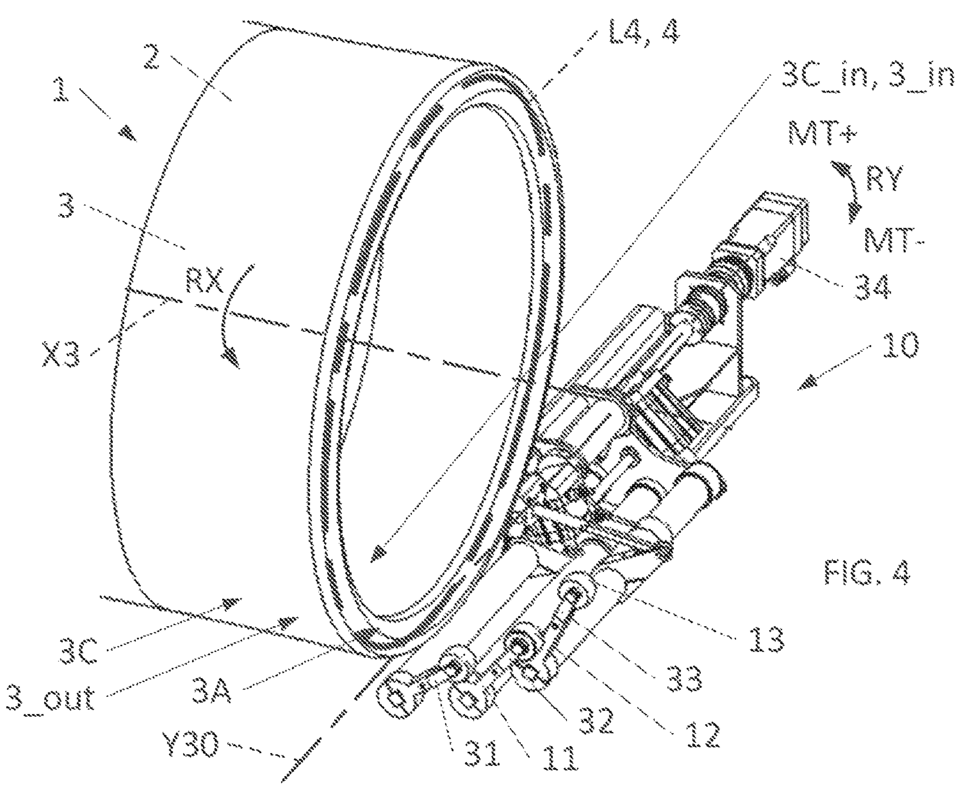
FIG. 4 shows, in a perspective detail view, the folding device with three pressure rollers of FIG. 3, in place facing a carcass assembly, within a system similar to that of FIG. 1, with the three pressure rollers in a withdrawn configuration such that the carcass assembly can rotate in a rolling movement without interfering with the pressure rollers.

According to a preferred arrangement, corresponding notably to FIGS. 3, 4 and 5, the three pressure rollers 11, 12, 13 have respective central axes Y11, Y12, Y13 which are all parallel to one another and to the same pitch axis 30.

It should be noted that, in this arrangement, not all the pressure rollers 11, 12, 13 are, strictly speaking, exactly tangential to the generatrix L4, L5 of the reinforcing bead core 4, 5, in that their respective central axes Y11, Y12, Y13 are not all strictly orthoradial with respect to the roll axis X3, since the central axes Y11, Y12, Y13 are parallel to one another and to the common pitch axis Y30, whereas the pressure rollers 11, 12, 13 are distributed in azimuth about the roll axis X3 in a plurality of angular working sectors A11, A12, A13. However, the pressure rollers, and therefore the angular working sectors A11, A12, A13 are sufficiently close to one another, and the extend of each is sufficiently small about the roll axis X3, to conform in geometrical terms with the conditions stated above, and thus to avoid any significant circumferential thrust on the end section 3A, 3B during folding.

Evidently, the disclosure also relates to a folding-up method as such.

The method may preferably be implemented by means of a system 1 as described in the foregoing text.

According to the disclosure, in the course of this folding-up method:

- in an initialization step (E0), as shown in FIG. 1, a tire carcass assembly 2 is placed on a receiving support 21 (which may preferably have some or all of the characteristics defined above), this carcass assembly having a cylindrical wall 3 extending along and about an axis X3 called the "roll axis" X3, together with a reinforcing bead core 4, 5 extending along a generatrix L4, L5 forming a ring about the roll axis X3, the cylindrical wall having a cylindrical end section 3A, 3B that projects axially beyond the reinforcing bead core 4, 5,
- in a folding step (E1), at least one pressing member 11, 12, 13, such as a pressure roller, is applied, as shown in FIGS. 6, 11, 13, 15 and 18, against the radially outer face 3A_out, 3B_out of the end section 3A, 3B, in an angular sector A11, A12, A13 of the cylindrical wall 3 called the "angular working sector" A11, A12, A13, which corresponds to a fraction of the circumference of the end section 3A, 3B about the roll axis X3, as is visible in FIG. 5, and the pressing member 11, 12, 13 is caused to make a tilting pitching movement MT about the generatrix L4, L5 of the reinforcing bead core, so that the pressing member 11, 12, 13 folds, towards the radially inner face 3_in of the cylindrical wall 3 of the carcass assembly 2, around the reinforcing bead core 4, 5, the portion of the end section 3A, 3B which is located in the angular working sector A11, A12 A13 in question, as shown in FIGS. 7 to 9, 12, 14, 16 and 19;
- in a disengagement step (E2) the pressing member is placed in a withdrawn configuration, in order to disengage the pressing member from any contact with the end section, as shown in FIGS. 4 and 10;
- in a repositioning step (E3) the relative position of the pressing member 11, 12, 13 with respect to the carcass assembly 2 about the roll axis X3 is modified by an angular increment, so as to place the pressing member 11, 12, 13 in a new angular working sector; here, more preferably, a roll rotation RX of the carcass assembly 2 is executed for this purpose, as shown in FIGS. 1 and 4, while the pressing members 11, 12, 13 remain in a fixed position in their withdrawn configuration;
- and the sequence is repeated, this sequence being called the "elementary sequence" and comprising, successively, the steps of folding (E1), disengagement (E2) and then repositioning (E3), as many times as required, until the end section 3A, 3B has been pressed, along the whole of its circumference about the roll axis X3, against the radially inner face 3_in of the wall 3 of the carcass assembly 2.

Advantageously, the method according to the disclosure makes it possible to fold the end section 3A, 3B progressively, in one angular sector after another.

The roll rotation RX of the carcass assembly is activated only if the pressing members 11, 12, 13 have been previously placed in the withdrawn configuration.

The roll rotation RX of the carcass assembly 2 continues to the extent exactly necessary and sufficient to offset the wall 3_in in roll by the value of an angular increment, preferably in the range from 1 to 5 degrees, depending on the diameter of the carcass assembly 2, from the locations of the pressing members 11, 12, 13. The roll rotation RX is then stopped, so as to allow the operation of the pressing members 11, 12, 13 in the angular working sectors A11, A12, A13 assigned to each of them.

For this purpose, the pressing members are brought into contact with the radially outer face 3A_out, 3B_out of the end section to be folded, and the tilting pitching movement RY of the tilting base 30 is then activated, so that the base 30 executes a tilting pitching movement MT about the pitch axis Y30, preferably an outward tilting pitching movement MT+ and a return tilting pitching movement MT−, in order to drive the pressing members and force the pressing members to fold the end section 3A, 3B against the radially inner face 3_in of the wall 3.

More particularly, the pressure rollers 11, 12, 13 thus execute roller pressing of the end section 3A, 3B, which, in the outward direction MT+, starts against the reinforcing bead core (FIGS. 15 and 16) and then continues against the radially inner wall 3C_in of the central section 3C of the wall 3 (FIGS. 16 and 17) until the pressure rollers reach their respective pitch arrival positions.

Preferably, a second roller pressing is executed, in the same angular working sector A11, A12, A13, when the pressure rollers 11, 12, 13 are returned to their pitch starting position by the return tilting movement MT− of the base 30.

It should be noted that, overall, each pressing member 11, 12, 13 describes, in the tilting pitching movement MT, a trajectory which is curved or possibly in the form of a circular arc, this trajectory being concave in the bisecting plane relative to the generatrix L4, L5, and therefore being enveloping, in that the concave trajectory substantially matches the substantially circular profile of the section of the reinforcing bead core 4, 5.

Advantageously, the elastic pre-stressing member 35 is biased, or "primed" in a manner of speaking, as soon as the pressing member or members 11, 12, 13 are in the working configuration, because, when the selector 40 manoeuvres the pressing members 11, 12, 13 to move them from their withdrawn configuration to their working configuration, the pressing members come to bear against the end section 3A, 3B and are therefore stressed between, on the one hand, the force generated by the actuating device 44, 45, 46 of the selector 40, in this case the pneumatic actuator 44, 45, 46, which tends to compel the pressing members 11, 12, 13 to approach and bear on the end section 3A, 3B, and, on the other hand, the reactive force exerted on the pressing members 11, 12, 13 by the end section 3A, 3B and the underlying reinforcing bead core 4, 5, against which the pressing members are thus bearing.

Thus the pressing members are subjected, throughout their tilting pitching movement MT, including the outward movement MT+ and the return movement MT−, to a preloading force that enables them to press the radially inner face 3A_in, 3B_in of the end section 3A, 3B effectively against the radially inner face 3_in of the wall 3.

In a particularly advantageous manner, the elastic suspension of the pressing members 11, 12, 13, here more particularly the elastic suspension of each arm 31, 32, 33 carrying a pressing member 11, 12, 13, this elastic suspension being provided here in torsion about an axis which here takes the form of the shaft 47, 48, 49 which is parallel to the pitch axis Y30 of the base 30, advantageously enables the pressing member 11, 12, 13 to modify the curvature of its trajectory about the generatrix L4, L5 during the tilting pitching movement MT, and more particularly to adjust the trajectory when the base 30 executes its pitch rotation RY, so that the pressing member 11, 12, 13 adapts its trajectory to the transition that takes place between a phase called the "phase of encircling the reinforcing bead core 4, 5", in which the trajectory is, in the bisecting plane, substantially in the form of a circular arc (as is the case for the second pressing member 12 in FIG. 13, or for the second and third pressing members 12, 13 in FIG. 15), as is the trajectory of the base 30, and a subsequent phase called the "flattening phase" in which the pressing member 11, 12, 13 continues its generally tilting movement beyond the reinforcing bead core 4, 5 along the wall of the central section 3C, so as to press the end section against the radially inner wall 3C_in of the central section, until it reaches the edge forming the free end of the end section 3A, 3B, but following for this purpose an adjusted trajectory which becomes virtually axial, that is to say virtually parallel to the roll axis (as is the case for the second pressing member 12 in FIG. 14, or for the second and third pressing members 12, 13 in FIGS. 16 and 17), and which therefore differs from the purely circular trajectory of the base 30. The elastic suspension of the arm 31, 32 advantageously provides the complementary movement component for changing from the circular trajectory of the base 30 to the more complex trajectory required to follow the path taken by the end section 3A, 3B as it becomes folded towards and on to the wall of the carcass assembly.

The ability of the arm 31, 32, 33 carrying the pressing member 11, 12, 13 to execute a different pitch tilt from that of the base 30, and therefore from the main pitch rotation RY executed by the base 30, while remaining subject to the elastic return due to the presence and stiffness of the elastic member 35, in this case the stiffness corresponding to the compressibility of the air used by the pneumatic actuator 44, 45, 46 of the selector 40, advantageously enables the pressing member 11, 12, 13 to accommodate and match the desired trajectory, and thus to reach an edge of the end section 4, 5 which may be relatively distant axially from the generatrix L4, L5 of the reinforcing bead core towards the inside of the central section 3C, for example an edge that may be located at an axial distance in the range from 1 to 15 cm, or even over 15 cm, of the generatrix L4, L5 when the end section 4, 5 has been fully folded and lies against the central section 3C, while maintaining at all times, during the tilting pitching movement MT, a pressure exerted by the pressing member 11, 12, 13 on the end section 4, 5 and directed against the reinforcing bead core 4, 5 and then against the portion of the wall adjacent to the reinforcing bead core 4, 5, that is to say against the central section 3C, to force the end section 4, 5 to match the shape of the reinforcing bead core 4, 5 and then that of the central section 3C, and thus to join closely, without creases or air bubbles, the radially inner face 3A_in, 3B_in of the end section 3A, 3B to the radially inner face 3C_in of the central section.

When the roller pressing operation has been executed by each pressing member 11, 12, 13 in the angular working sector A11, A12, A13 assigned to it, the pressing members are placed back in the withdrawn configuration (FIGS. 4 and 10), and a new roll rotation RX by an angular increment is executed, to place the pressing members 11, 12, 13 each facing a new angular working sector, preferably substantially adjacent to the angular working sector that they have just left, so as to continue and extend the folding of the end section 3A, 3B along the circumference of the end section.

Preferably, in the folding step (E1), the end section 3A, 3B is progressively folded around the reinforcing bead core 4, 5 by actuating a plurality of pressing members 11, 12, 13, preferably three pressing members 11, 12, 13, which occupy successive different angular working sectors A11, A12, A13 around the roll axis X3, so that the first of the pressing members 11 starts the folding in its first angular working sector A11; the next pressing member A12 continues and intensifies the folding when the portion of the first end section 3A shaped by the first pressing member 11 reaches, after one or more angular increments of rotation about the roll axis X3, the angular working sector A12 occupied by the next pressing member 12; and the last of the pressing members 13 completes the folding, in the angular working sector A13 occupied by the last pressing member 13, by completely pressing the end section 3A, up to the free end (that is to say, the edge) of the end section 3A, against the radially inner face 3_in of the wall 3 of the carcass assembly 2, in order to trap the reinforcing bead core 4, 5 in the fold thus formed.

Such an implementation may be applied with two pressing members, in which case the next pressing member and the last pressing member are one and the same, or, preferably with three or more pressing members.

Figure 14:
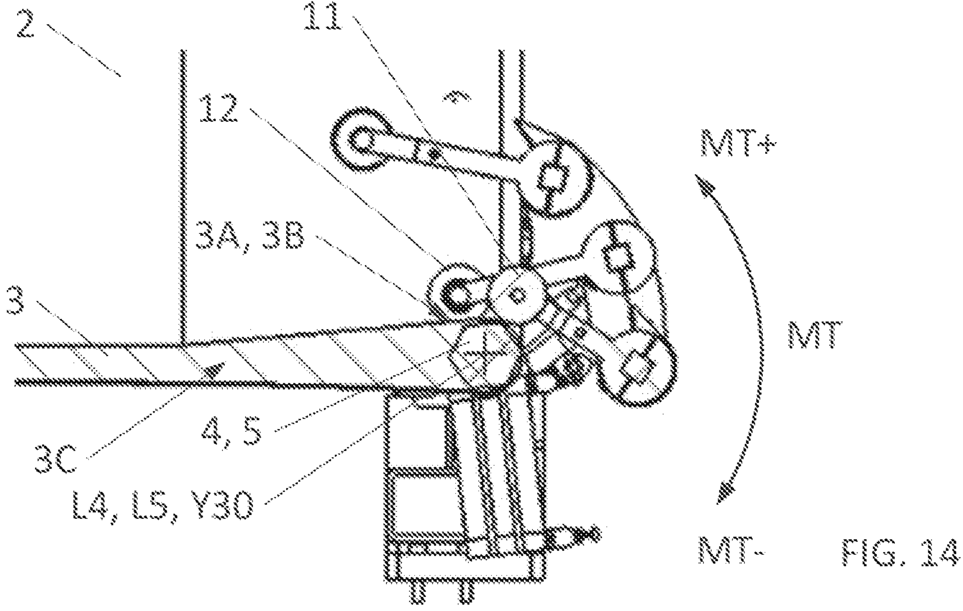
FIG. 14 shows, in the same sectional view, the system of FIG. 13 after the execution of the outward phase of the tilting pitching movement, the first pressure roller and the second pressure roller thus being in their respective arrival positions, after each of them has folded the portion of the end section assigned to it.

Preferably, the first pressing member 11 is initially placed in the working configuration (FIG. 11), enabling the first pressing member 11 to come to bear, and remain, against the radially outer face 3A_out, 3B_out of the end section 3A, 3B during the tilting pitching movement MT, while the other following pressing member or members 12, 13 remain in the withdrawn configuration which prevents them from interfering with the end section 3A, 3B while the first pressing member 11 executes its tilting pitching movement or movements MT, and a plurality of elementary sequences are executed (FIGS. 10, 11, 12), with only the first pressing member 11 thus engaged, without the other pressing members interacting with the end section 3A, 3B, until the portion of the end section 3A shaped by the first pressing member 11 reaches, or passes beyond, the angular working sector A12 occupied by the next pressing member 12, here the second pressing member 12, and the next pressing member 12 is then placed in the working configuration (FIG. 13) before the continuation of the elementary sequences, in the course of which, at each new angular increment of rotation of the carcass assembly 2 about the roll axis X, the first pressing member 11 and the next pressing member 12 each proceed to fold the portion of the cylindrical end section 3A, 3B located in the angular working sector A11, A12 corresponding to them (FIG. 14).

Similarly, the method waits until the end section 3A, 3B processed by the second pressing member 12 reaches the location of the third pressing member 13 before engaging the third pressing member, in its turn, in the folding process (FIGS. 15 and 16).

Thus the method may comprise a transitional state (FIGS. 10 to 14) in which there is a progressive engagement of the pressing members 11, 12, 13, one after another, in order, notably, to avoid the engagement of an "unprocessed" portion of the end section 3A, 3B, that is to say a portion whose folding has not been commenced, directly facing a pressing member, here typically the second or the third pressing member 12, 13, the angular pitch travel of which would not be suitable for operation on such an unprocessed section, and would therefore risk causing the creasing or tearing of the end section 3A, 3B.

When all the pressing members 11, 13 have been engaged, the system is in the steady state (FIGS. 15 to 17) in which all of the pressing members, at each new angular increment of the carcass assembly 2 in roll around the roll axis X3, are placed in the working configuration (FIGS. 15 and 18), and all of them execute, preferably jointly, the tilting pitching movement MT (FIGS. 16, 17, 19) which enables them to interact with the end section, in the angular working sectors A11, A12, A13 assigned to them, to carry out the folding.

For guidance, the "distance" between the engagement of the second pressing member 12 from the engagement of the first pressing member 11 may represent 20 to 30 angular increments. Thus it will be ensured that, when the second pressing member 12 intervenes, the first pressing member 11 will be sufficiently far ahead, so to speak; in other words, it will have started to fold the end section 3A, 3B over a cumulated angular sector that is sufficiently extensive around the roll axis X3 for the activation of the second pressing member 12 not to cause any creasing or incorrect folding.

Preferably, the value of the angular increment by which the cylindrical wall 3 of the carcass assembly 2 is offset, in each elementary sequence, with respect to the pressing member 11, 12, 13 in question, about the roll axis X3, that is to say, in this case, the angular roll rotation movement RX of the carcass assembly 2 between two successive interventions of the folding device 10, is in the range from 1 to 5 degrees. As indicated above, the value of the angular increment depends on the with W11 W12, W13 of the pressing member, and is preferably equal to the value of the corresponding working sector covered by the pressing member 11, 12, 13.

Preferably, the pressing member, and if appropriate each pressing member 11, 12, 13, is formed by a pressure roller 11, 12, 13 which is mounted rotatably, preferably in free rotation, on its central axis Y11, Y12, Y13, and the central axis Y11, Y12, Y13 is, and remains during its tilting pitching movements MT, substantially parallel, at +/−10 degrees or preferably at +/−5 degrees, or even more preferably exactly parallel, to the normal to a radial plan called the "bisecting plane" that contains the roll axis X3 together with the bisector of the angular working sector A11, A12, A13 occupied by the pressure roller 11, 12, 13 in question.

Of course, the disclosure is in no way limited only to the above-mentioned exemplary embodiments, a person skilled in the art being notably capable of isolating or freely combining one or another of the above-described features with one another, or of substituting equivalents therefor.

What is claimed is:

1. A folding-up system intended to fold an end section of a cylindrical wall of a tire carcass assembly around a reinforcing bead core of said carcass assembly, said cylindrical wall extending along and around a central roll axis, and said reinforcing bead core extending along a generatrix forming a ring around said roll axis, said system comprising:

- a folding device, comprising at least one pressing member such as a pressure roller, and arranged to cause said pressing member to be applied against a radially outer face of the end section, in an angular working sector of the cylindrical wall which corresponds to a fraction of a circumference of the end section around the roll axis, and to cause said pressing member to execute a tilting pitching movement about the generatrix of the reinforcing bead core, so that the pressing member folds the portion of the end section located in the angular working sector concerned towards a radially inner face of the cylindrical wall of the carcass assembly, around the reinforcing bead core,
- a drive device designed to modify a relative position of the pressing member, by successive angular increments, with respect to the carcass assembly about the roll axis, so that the pressing member can execute its tilting pitching movement in different angular working sectors in order to fold the corresponding portions of the end section one after another,
- a selector designed to place the pressing member, alternately, in a working configuration, enabling said pressing member to bear against the radially outer face of the end portion in the angular working sector concerned and to force the corresponding portion of the end section to be folded when the folding device executes the tilting pitching movement in said angular working sector concerned, and then in a withdrawn configuration which prevents said pressing member from interfering with the end section when the drive device modifies the relative position of said pressing member with respect to the cylindrical wall of the carcass assembly, about the roll axis, to change the angular working sector, wherein the system comprises an automatic sequencer that is programmed to execute and repeat, as often as required, until the end section has been pressed, along its whole circumference about the roll axis, against the radially inner face of the wall of the carcass assembly, during an elementary sequence:

- the selector places at least one pressing member in the working configuration;
- the folding device causes said at least one pressing member to execute the tilting pitching movement about the generatrix of the reinforcing bead core, in the angular working sector in question, so as to fold towards the radially inner face of the wall of the carcass assembly the portion of the end section that is located in said angular working sector;

the selector places the at least one pressing member back in the withdrawn configuration;

the drive device offsets the wall of the carcass assembly about the roll axis by a chosen angular increment, relative to the at least one pressing member, so as to place said at least one pressing member in a new angular working sector, separate from the preceding angular working sector in question.

2. The system according to claim 1, wherein the folding device comprises a plurality of pressing members which are offset angularly from one another in azimuth about the roll axis, so as to engage with the radially outer face of the end section in different angular working sectors placed in succession around the roll axis, along the generatrix of the reinforcing bead core, and wherein said plurality of pressing members have ranges of pitch travel about the generatrix that are complementary to one another, so that each pressing member intensifies in turn, by an individual contribution, the folding of the end section over and around the reinforcing bead core towards the radially inner face of the wall of the carcass assembly.

3. The system according to claim 2, wherein each of the plurality of pressing members provides, in its tilting pitching movement, the individual contribution to the folding of the end section, which individual contribution corresponds to an amplitude of angular movement of the pressing member in question, in pitching about the generatrix of the reinforcing bead core, which is at least equal to 30 degrees for the each pressing member in question.

4. The system as set forth in claim 3, wherein the amplitude of the angular movement of the pressing member is in the range of 60 degrees to 120 degrees.

5. The system according to claim 1, wherein the drive device comprises a receiving support which is mounted on a frame and which is arranged to receive the carcass assembly and to drive said carcass assembly in rotation relative to the frame, by successive angular increments, about the roll axis, and in that the folding device comprises a tilting base carrying an arm supporting the pressing member, which tilting base is mounted for rotation relative to the frame about a pitch axis, which is transverse and orthogonal to the roll axis, and which embodies the axis about which the tilting pitching movements of the pressing member.

6. The system according to claim 5, wherein the arm carrying the pressing member has a degree of freedom in differential pitch rotation relative to the tilting base, this differential pitch rotation taking place about the pitch axis or about an axis parallel to said pitch axis and separate from said pitch axis, and being dependent on an elastic member.

7. The system according to claim 5, further comprising a plurality of pressing members, and wherein the plurality of pressing members are carried by the same tilting base, so that the rotation of said tilting base drives said plurality of pressing members jointly in their tilting pitching movement about the reinforcing bead core.

8. The system according to claim 1, wherein the selector comprises a pneumatic actuator associated with the pressing member, or a plurality of pneumatic actuators, each associated with one of the plurality of pressing members, said pneumatic actuator being arranged, to control a passage of the pressing member associated therewith from the withdrawn configuration to the working configuration and vice versa, and to provide, in the working configuration, prestressing and elastic suspension of the pressing member in question against the end section.

9. The system according to claim 1, wherein the folding device is arranged so as to cause the pressing member to execute, in the angular working sector concerned, an outward and return tilting pitching movement about the generatrix of the reinforcing bead core, from a pitch starting position to a pitch arrival position, and then in reverse, from the pitch arrival position, to return to the pitch starting position.

10. The system according to claim 1, wherein the pressing member, and if appropriate each pressing member, is formed by a pressure roller which is mounted rotatably on its central axis, which central axis is, and remains during the tilting pitching movement, substantially parallel, at +/−10 degrees to the normal to a radial bisecting plane that contains the roll axis together with the bisector of the angular working sector where the tilting pitching movement of the pressure roller starts.

11. The system as set forth in claim 1, wherein the automatic sequencer is an electronic control unit.

* * * * *